United States Patent
Chen et al.

(10) Patent No.: US 10,439,387 B2
(45) Date of Patent: Oct. 8, 2019

(54) ADVANCED GROUND FAULT CIRCUIT INTERRUPTERS (GFCI) AND METHODS OF OPERATION THEREOF

(71) Applicant: Ze Chen, Yueqing, Zhejiang Province (CN)

(72) Inventors: Ze Chen, Yueqing (CN); Boon Lum Lim, Singapore (SG); Samuel Raj, Singapore (SG)

(73) Assignee: Ze Chen, Yueqing (CN)

( * ) Notice: Subject to any disclaimer, the term of this patent is extended or adjusted under 35 U.S.C. 154(b) by 238 days.

(21) Appl. No.: 15/393,440

(22) Filed: Dec. 29, 2016

(65) Prior Publication Data
US 2018/0191150 A1    Jul. 5, 2018

(51) Int. Cl.
H02H 3/00 (2006.01)
H02H 3/17 (2006.01)
H02H 3/07 (2006.01)
H02H 1/00 (2006.01)

(52) U.S. Cl.
CPC ............ *H02H 3/17* (2013.01); *H02H 1/0069* (2013.01); *H02H 3/07* (2013.01)

(58) Field of Classification Search
USPC ..................................................... 361/42–48
See application file for complete search history.

(56) References Cited

U.S. PATENT DOCUMENTS

| 5,280,404 | A * | 1/1994 | Ragsdale | ............. | H02H 1/0015 |
| | | | | | 361/113 |
| 5,729,145 | A | 3/1998 | Blades | | |
| 7,253,637 | B2 * | 8/2007 | Dvorak | ................ | G01R 31/024 |
| | | | | | 324/536 |
| 8,599,523 | B1 * | 12/2013 | Ostrovsky | ............ | G01R 31/025 |
| | | | | | 361/45 |
| 8,779,875 | B2 | 7/2014 | Chen | | |
| 8,847,712 | B2 * | 9/2014 | Chen | ..................... | H01H 83/04 |
| | | | | | 335/18 |
| 2003/0102944 | A1 | 6/2003 | Leopold | | |
| 2004/0066593 | A1 * | 4/2004 | Kolker | ................ | G01R 31/025 |
| | | | | | 361/42 |
| 2005/0264962 | A1 | 12/2005 | Kim | | |
| 2005/0286184 | A1 | 12/2005 | Campolo | | |
| 2006/0114627 | A1 * | 6/2006 | Wong | ................... | H02H 1/0015 |
| | | | | | 361/42 |

(Continued)

FOREIGN PATENT DOCUMENTS

CN    201210024531.5    2/2012

*Primary Examiner* — Ronald W Leja

(74) *Attorney, Agent, or Firm* — Mei & Mark LLP

(57) ABSTRACT

In one example, a ground fault circuit interrupter is provided. It may include a current imbalance detection circuit configured to provide a leakage signal and a main processing circuit including a processor. The leakage signal may correspond to a current imbalance between a supply path and a return path. The processor may be configured to receive the leakage signal, analyze a time pattern of the leakage signal, determine whether a ground fault exists based on analysis of the time pattern, and generate a first trigger signal if the ground fault is determined to exist. The ground fault circuit interrupter may further include a back-EMF detection circuit configured to provide a back-EMF detection signal. Methods for detecting and responding to a ground fault are also provided.

24 Claims, 22 Drawing Sheets

(56) References Cited

U.S. PATENT DOCUMENTS

| | | |
|---|---|---|
| 2006/0279886 A1 | 12/2006 | Huang |
| 2007/0030608 A1* | 2/2007 | Baldwin ................ H01H 83/04 |
| | | 361/42 |
| 2008/0067960 A1* | 3/2008 | Maeda ................... B62D 5/046 |
| | | 318/400.02 |
| 2008/0129307 A1 | 6/2008 | Yu |
| 2010/0060469 A1 | 3/2010 | Hetzmannseder |
| 2010/0157488 A1* | 6/2010 | Hall .................... H02H 1/0015 |
| | | 361/42 |
| 2010/0324747 A1 | 12/2010 | Lee |
| 2014/0098446 A1 | 4/2014 | Aromin |
| 2014/0268437 A1 | 9/2014 | Simonin |
| 2016/0294179 A1* | 10/2016 | Kennedy ................. H01H 9/54 |
| 2018/0083434 A1* | 3/2018 | Lim ....................... H01H 71/62 |
| 2018/0191150 A1* | 7/2018 | Chen ....................... H02H 3/17 |

\* cited by examiner

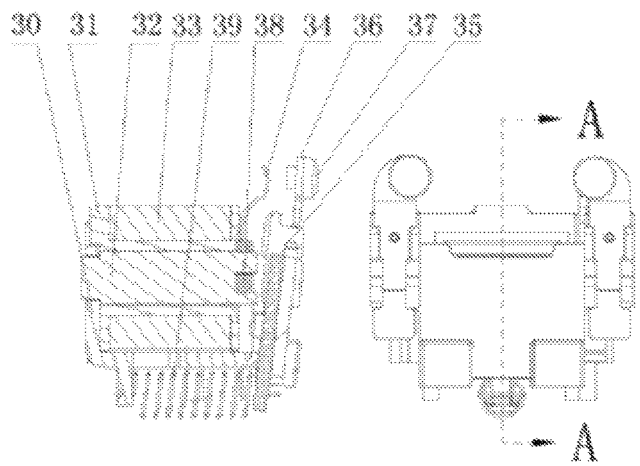
Section A-A
*FIG. 4H*
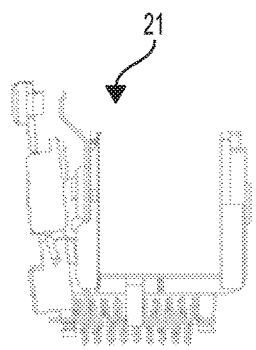
*FIG. 4I*
*FIG. 4J*
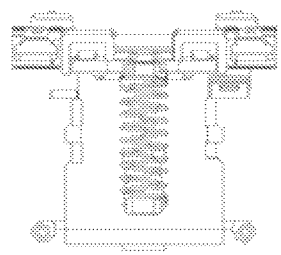
*FIG. 4K*

SECTION B-B

SECTION C-C

ADVANCED GROUND FAULT CIRCUIT INTERRUPTERS (GFCI) AND METHODS OF OPERATION THEREOF

TECHNICAL FIELD

The present disclosure relates to apparatuses, systems, and algorithmic methods for evaluating potential ground fault phenomenon or characteristics, for example, for use in a Ground Fault Circuit Interrupter (GFCI). The present disclosure also relates to an innovative current leakage signal analysis and innovative back electromotive force (EMF) detection, to detect and identify ground fault occurrences and to reduce false positives. Further, the present disclosure relates to periodical automatic self-testing procedure. The present disclosure also relates to a force triggering mechanism for quick and easy manual testing to ensure proper triggering and operation of tripping mechanisms. Further, this disclosure pertains to detection of end-of-life (EOL) conditions for a GFCI apparatus, and the consequent commencement of a non-reversible EOL state.

BACKGROUND

Conventional earth current leakage circuit breakers and over-current fuses are commonly deployed to prevent injuries to people and property from dangerous conditions resulting from, for example, current leakages or fires resulting from electrical faults.

Such devices typically detect the occurrence of certain types of electrical faults to prevent harm to persons and property. However, when such conventional devices are employed, some electrical faults may not be detected and such devices may falsely detect electrical faults where none exist. Such errors may be due to the lack of intelligent ground fault identification systems in conventional devices.

Ground faults may be commonly defined as the existence of a current imbalance between the supply and the return path wherein an undesirable and significant amount of the unreturned current is leaking, or passing through an object—for example a human body, to the ground. Notably, the passage of electrical current through the human body may cause injury or even death.

Underwriters Laboratories (UL), an American Worldwide Safety Consulting and Certification Organization, provides criteria that GFCIs and similar devices must meet in order to qualify as approved ground fault detection devices. Such criteria may further require GFCIs and similar devices to avoid false detection of ground faults when provided with current draws that may resemble ground faults, such as back-EMF noise or certain pulsed current draws.

Because the failure to detect an actual ground fault may result in serious safety hazards, conventional apparatuses typically are typically over-inclusive when determining the presence of a ground fault. Such conventional apparatuses do not provide for analysis or investigation of the nature of the leakage waveform. While erring on the side of determining that electrical faults exist may have beneficial safety effects, this may increase the frequency of both false positives of ground fault detection and unnecessary tripping of GFCIs.

Certain electrical appliances and apparatuses may draw current in a manner that may resemble ground fault phenomena, at least when observed by conventional GFCIs and similar devices. For example, certain electrical appliances may generate back-EMF noise or exhibit other irregular current drawing behavior during normal operation. Thus, a conventional electrical protection circuit that determines the presence of a ground fault merely based on the existence of an unbalanced current condition may falsely detect ground faults. Accordingly, conventional electronic fault detection systems that do not perform a more detailed analysis of a leakage waveform may disturb the normal operation of electrical appliances by the false detection of electrical faults and by inappropriately tripping electrical safety circuits. Such conventional electronic fault detection systems may also be out of compliance with UL or other regulatory requirements.

While it may be desirable to have GFCIs and other electronic fault detection systems engage in a more detailed analysis of a fault detection waveform in order to reduce occurrences of false fault detection and inappropriate tripping, it may also be important that any such analytic processing algorithm accurately identify a leakage waveform so that it will not fail to detect a true ground fault or other qualifying current leakage condition. Thus, an in-depth analysis of a leakage signal waveform and its analytic signature may provide useful information and parameters to make an accurate and safe determination as to whether a ground fault truly exists.

Therefore, there is a need to be able to identify and detect true ground faults, while also accommodating the operation of certain electrical appliances that may be characterized by unusual current draws. More specifically, it may be desirable to distinguish actual ground faults from other unusual current draws by evaluating and characterizing a current leakage waveform.

Additionally, there remains a need for a tripping mechanism to ensure a proper, flexible trip operation at the time desired. There further remains a need for such a tripping mechanism to provide automatic and/or manual testing functionality to ensure that the GFCI and/or other electrical protection devices work properly.

SUMMARY

The present disclosure provides a description of apparatuses, systems, and methods to address the perceived needs and desires described above.

In one example, a ground fault circuit interrupter is provided. It may include a current imbalance detection circuit configured to provide a leakage signal and a main processing circuit including a processor. The leakage signal may correspond to a current imbalance between a supply path and a return path. The processor may be configured to receive the leakage signal, analyze a time pattern of the leakage signal, determine whether a ground fault exists based on analysis of the time pattern, and generate a first trigger signal if the ground fault is determined to exist.

The processor may be further configured to measure a duration of a logic low of the leakage signal in order to analyze the time pattern, and compare the duration of the logic low to a predetermined logic low threshold in order to determine whether the ground fault exists. The predetermined logic low threshold may be between 1.6 ms and 1.8 ms.

The processor may be further configured to count a number of pulses of the leakage signal occurring within a predetermined measurement window in order to analyze the time pattern and compare the number of counted pulses with a predetermined number of pulses in order to determine whether the ground fault exists. The predetermined measurement window may be less than or equal to 10 ms and the predetermined number of pulses may be between 12 and 18.

The ground fault circuit interrupter may further include a back-EMF detection circuit configured to provide a back-EMF detection signal. The processor may be further configured to receive and evaluate the back-EMF detection signal, and, based on the back-EMF detection signal, determine whether back-EMF noise is occurring or has just occurred. The processor may be further configured to refrain from determining that the ground fault exists if back-EMF noise is occurring or has just occurred. The processor may be further configured to determine that back-EMF noise is occurring or has just occurred when the back-EMF detection signal is not a logic high.

The ground fault circuit interrupter may further include a trip coil assembly configured to trip the ground fault circuit interrupter in response to the first trigger signal, and a reset button assembly configured to place the tripped ground fault circuit interrupter back into an operating condition.

The processor may be further configured to administer a self-test at start-up and cyclically on a self-test interval to determine if the ground fault circuit interrupter is in an end-of-life condition, and generate the first trigger signal and a second trigger signal if the ground fault circuit interrupter is in the end-of-life condition. The self-test interval may be between 1 and 4 hours.

The ground fault circuit interrupter may further include a trip coil assembly configured to trip the ground fault circuit interrupter in response to the first trigger signal, and a safety lock coil assembly configured to place a tripped ground fault circuit interrupter in an end-of-life state in response to the second trigger signal. The ground fault circuit interrupter may further include a reset button assembly configured to place the ground fault circuit interrupter back into an operating condition if the ground fault circuit interrupter is tripped and not in the end-of-life state.

The ground fault circuit interrupter may further include a force trigger testing mechanism configured to trip the ground fault circuit interrupter regardless of whether the ground fault interrupter is powered, and a test button configured to activate the force trigger testing mechanism.

The ground fault circuit interrupter may further include an LED. The processor may be further configured to monitor operating conditions on a monitoring interval to determine if there is an abnormal operating condition, and provide a signal to the LED if the abnormal operating condition is determined to exist. The monitoring interval may be between 10 and 15 minutes.

In another example, a method for detecting and responding to a ground fault is provided. It may include receiving a leakage signal, assessing a time pattern of the leakage signal to determine whether a ground fault exists, and generating a trigger signal if the ground fault is determined to exist.

Assessing the time pattern may include measuring a duration of a logic low of the leakage signal, comparing the duration of the logic low to a predetermined logic low threshold, and determining that the ground fault exists if the duration of the logic low is greater than the predetermined logic low threshold. The predetermined logic low threshold may be between 1.6 ms and 1.8 ms.

Assessing the time pattern may include counting a number of pulses of the leakage signal occurring within a predetermined measurement window, and determining that the ground fault exists if the number of counted pulses is greater than a predetermined number of pulses. The method may further include determining that the ground fault is a neutral to ground leakage if the number of counted pulses is greater than the predetermined number of pulses. The predetermined measurement window may be less than or equal to 10 ms and the predetermined number of pulses may be between 12 and 18.

In yet another example, a method for detecting and responding to a ground fault is provided. The method may include receiving a leakage signal, receiving a back-EMF detection signal, and evaluating the back-EMF detection signal to determine whether back-EMF noise is not occurring and has not just occurred. The method further includes, if it has been determined that back-EMF noise is not occurring and has not just occurred, assessing a time pattern of the leakage signal to determine whether the ground fault exists. Additionally, the method includes generating a trigger signal if the ground fault is determined to exist. Evaluating the back-EMF detection signal may include determining that back-EMF noise is not occurring and has not just occurred when the back-EMF detection signal is a logic high.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate certain embodiments of the present disclosure and together with the description, serve to explain the principles of this disclosure.

FIGS. 4H-4K are views of a relay assembly of the embodiment of FIGS. 4A-4G.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Figure 2A:
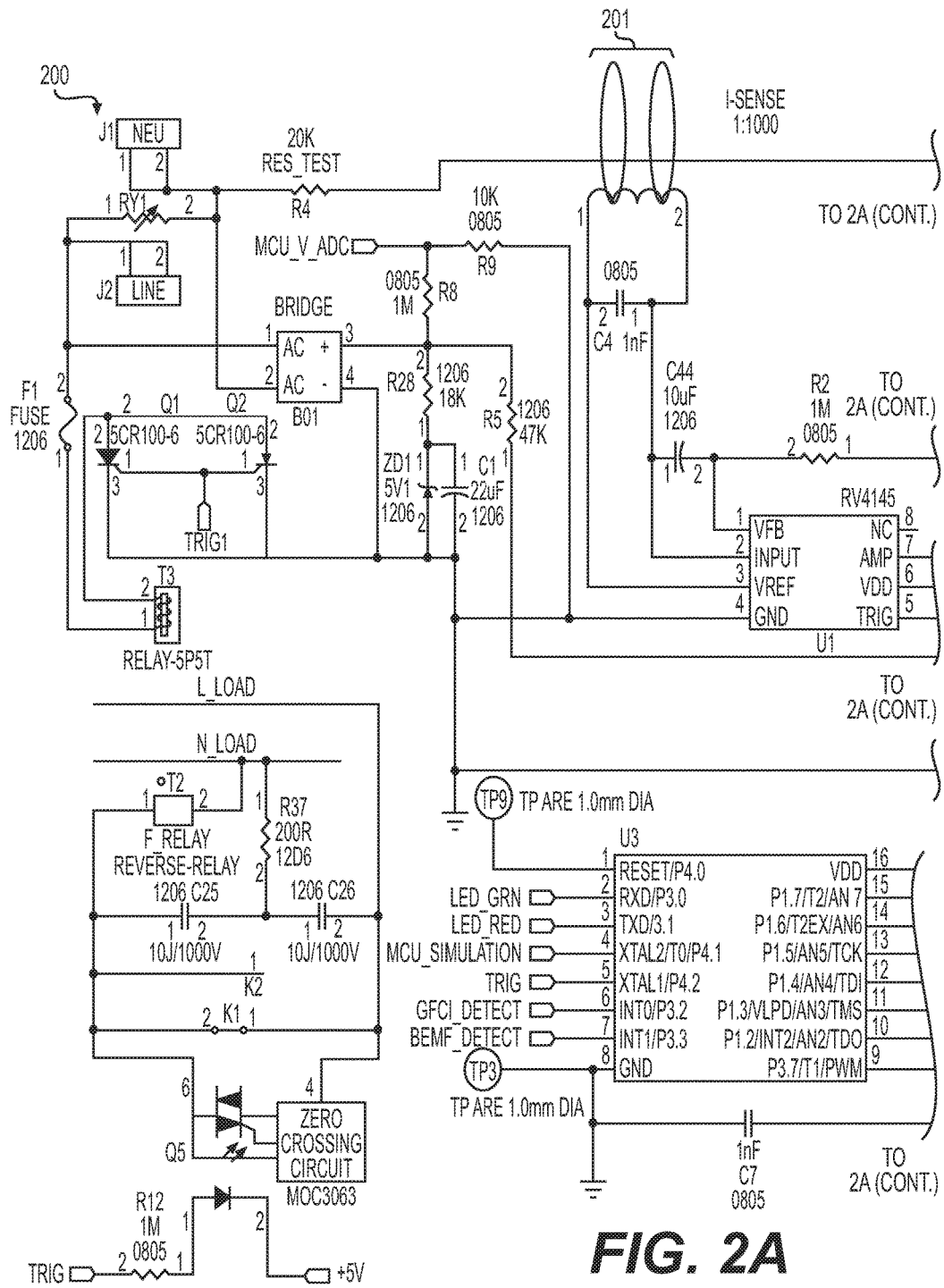
FIGS. 2A-2D depict a circuit diagram of an embodiment of a GFCI of the present disclosure, and portions thereof.
Figure 2A:
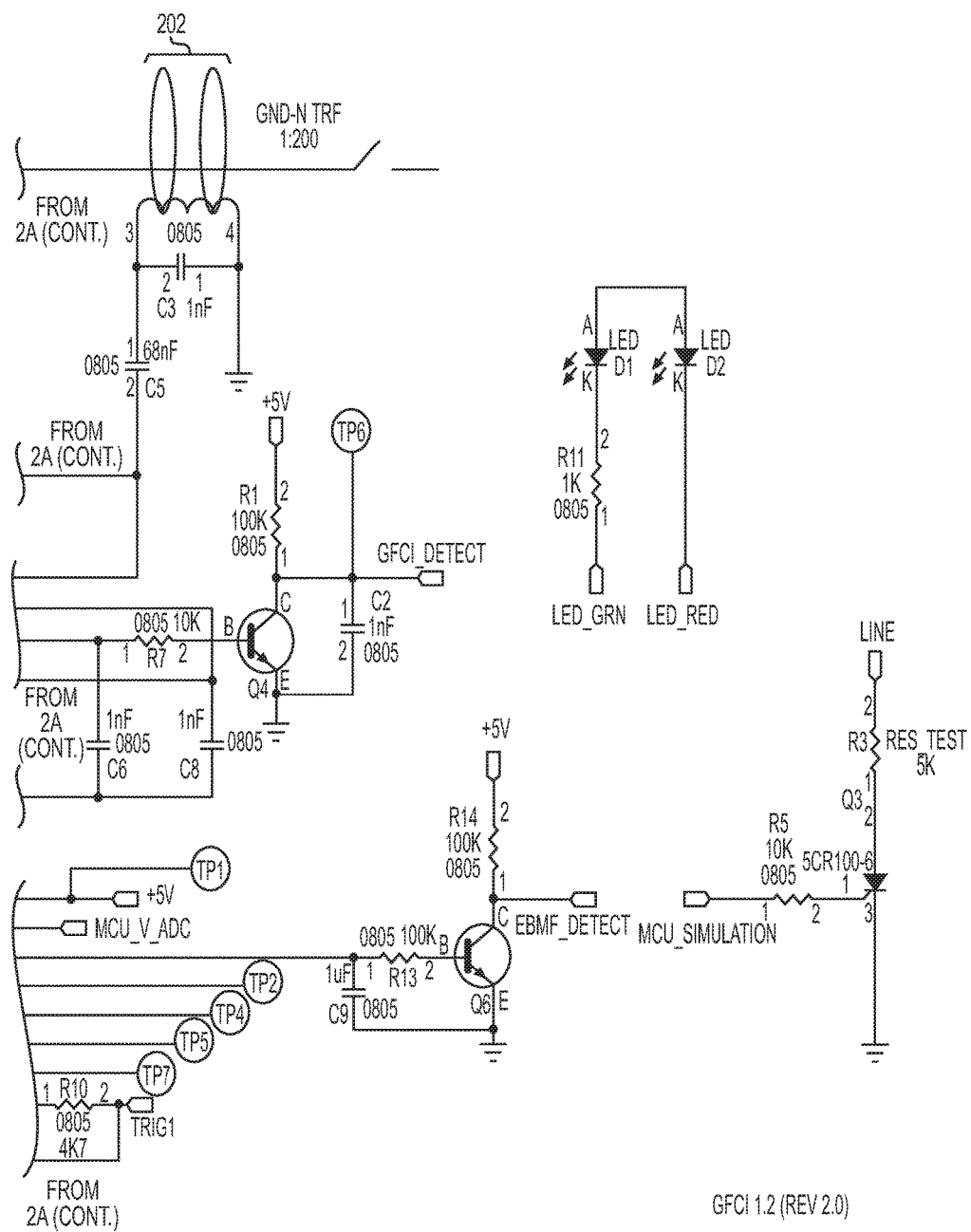

FIG. 2A depicts an exemplary circuit schematic for GFCI circuitry 200. It includes an exemplary current imbalance detection circuit 210 to provide a leakage signal (at GFCI_DETECT); and an exemplary back-EMF detection circuit 230 to detect back-EMF and provide a back-EMF detection signal (at EBMF_DETECT) that may be used to avoid false detection of ground faults that may result from back-EMF noise. Consistent with this disclosure, the respective signals may be processed and analyzed by main processing circuit 220, which may comprise for example, microcontroller unit (MCU) 221 to determine the presence of and/or classify a ground fault. Subsequent to such determination or clarification, MCU 221 may, as appropriate, engage a tripping mechanism to halt the supply of power to the circuit load.

The ground fault detection and circuit interruption operation of exemplary GFCI circuit 200 is described below.

Figure 2B:
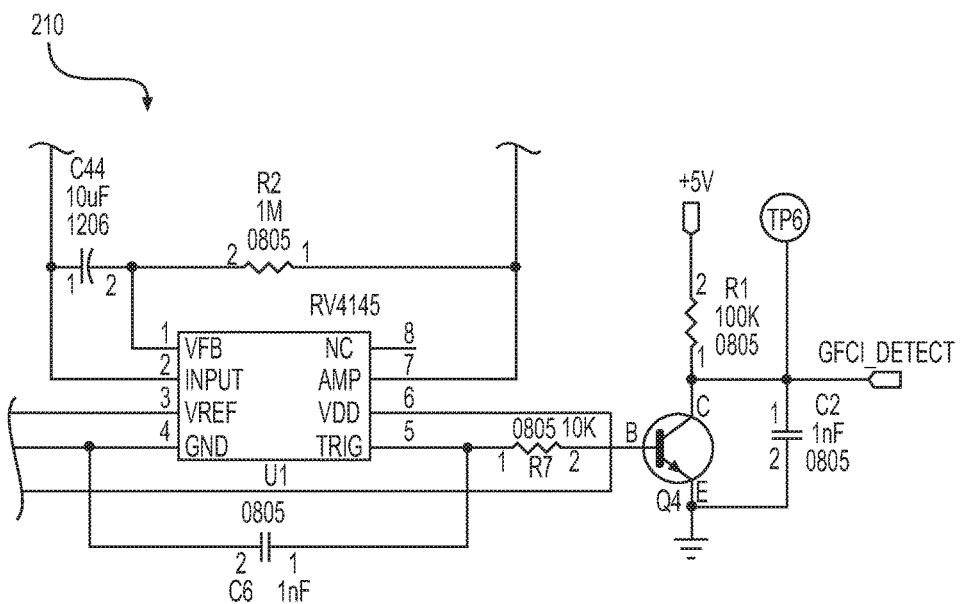

FIG. 2B depicts an exemplary current imbalance detection circuit 210 of GFCI circuitry 200. Current imbalance detection circuit 210 may be configured to detect and indicate when there is a significant imbalance in the current between the supply and the return path. Such an imbalance may indicate the potential existence of a leakage current, and perhaps, a ground fault condition. As further discussed herein, current imbalance detection circuit 210 may provide a leakage signal indicative of current imbalance at point GFCI_DETECT.

In exemplary embodiments, circuit 210 may comprise Low Power Ground Fault Interrupter IC RV4145 manufactured by Fairchild Semiconductor. As would be understood by a person of skill in the art, current imbalance detection circuit 210 may operate similarly to a ground fault interrupter circuit, or a portion thereof, in a conventional GFCI. For example, as shown in FIG. 2A, current imbalance detection circuit 210 may receive input for determining a current imbalance from a set of circuit that components includes LC coils 201, 202. However, using current imbalance as an indicator of a ground fault, alone, may insufficient to reliably determine the presence of a true ground fault. As explained below, the leakage signal output at GFCI_DETECT may be further analyzed to achieve a high confidence determination of whether or not a ground fault exists.

Figure 2C:
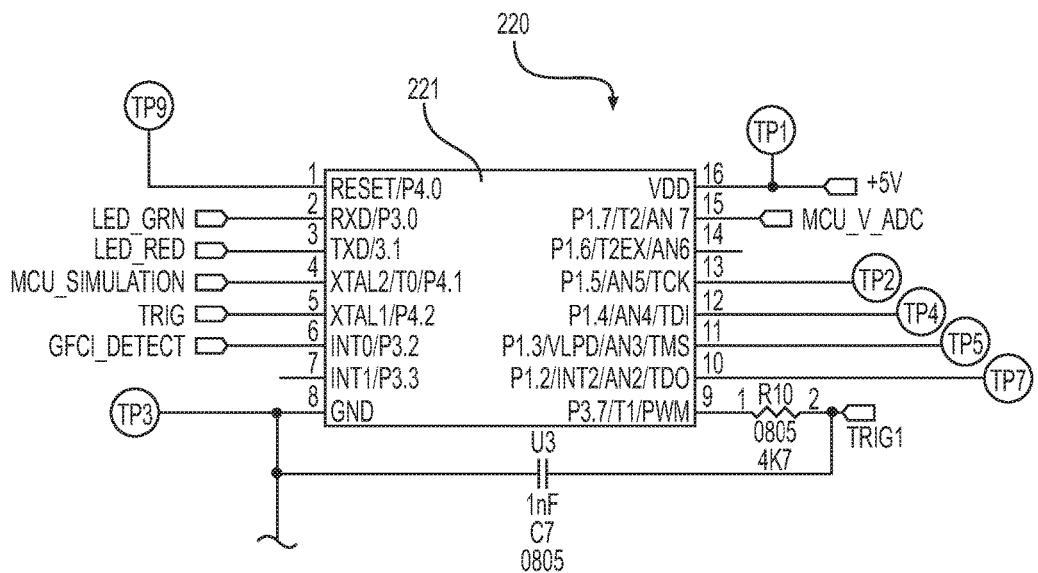

FIG. 2C depicts an exemplary main processing circuit 220 of GFCI circuitry 200. Main processing circuit 220 may include microcontroller unit 221, which may receive the leakage signal from current imbalance detection circuit 210. Among other functions, main processing circuit 220 may analyze the time pattern of the leakage signal and ultimately use such time pattern analysis to determine the presence or absence of a ground fault condition. Further, as described below, main processing circuit 220 may receive and process an back-EMF detection signal from back-EMF detection circuit 230 to assess whether electrical signal irregularities may be due to back-EMF noise rather than a ground fault.

Figure 3A:
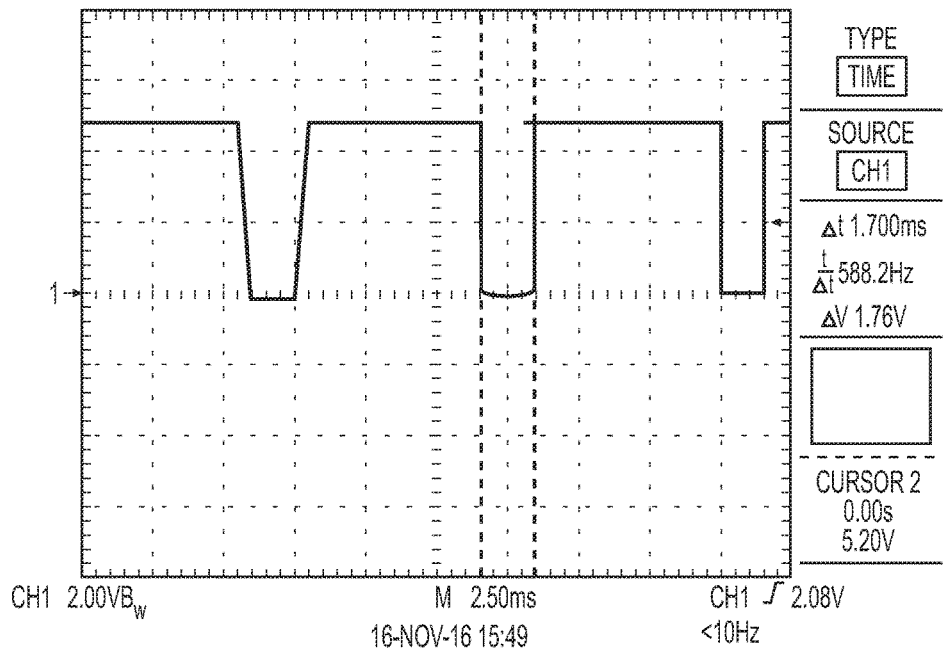
FIGS. 3A-3G are illustrations of measured and simulated waveforms of an embodiment of a GFCI of the present disclosure under various conditions.

MCU 221 may, in some embodiments, accomplish the functions described herein by executing a computer program stored on a non-transitory computer readable storage medium. Such computer readable storage medium may be included within MCU 221, external to MCU 221, or partially within and partially external to MCU 221. In alternative embodiments, a single IC may provide the functionality of both main processing circuit 220 and current imbalance detection circuit 210, both main processing circuit 220 and back-EMF detection circuit 230, or all three circuits.

Where current imbalance detection circuit 210 detects a current imbalance equal to or greater than a minimum threshold of, for example, 4 mA, 5 mA, or the like, it may determine that a leakage current is occurring. In exemplary embodiments, circuit 210 may provide a leakage signal to MCU 221 resembling, for example, the leakage waveform depicted in FIG. 3A. In some embodiments, for example as in FIG. 2B, transistor Q4 may be used to invert the output from Low Power Ground Fault Interrupter IC RV4145 before providing it to MCU 221 at point GFCI_DETECT.

The leakage waveform may be processed by MCU 221. Where the waveform is characterized by a consistent logic low of the leak waveform, MCU 221 may determine that a significant current imbalance, and therefore a ground fault, has occurred. In exemplary embodiments, a logic low lasting for a logic low threshold, of, for example, 1.7 ms, or longer may be considered a consistent logic low, which in turn may indicate that a current leakage situation of 5 mA or more is occurring.

MCU 221 may be configured as to be interrupted when the leakage signal provided at GFCI_DETECT drops from a logic high to a logic low. Then, MCU 221 may begin to measure the time pattern, including the logic low duration.

Where the total of logic low duration is equal to or larger than 1.7 ms, or another predetermined logic low threshold, it may be determined that there is a leaking current of greater than 5 mA, or another corresponding current imbalance threshold. Then, MCU 221 may initiate a process to trip the GFCI mechanism, and cease providing power to the outlet.

Additionally, the time pattern may be measured by counting the number of pulses—e.g., logic transitions to low then back to high (or vice versa)—within a predetermined measurement window. MCU 221 may count such pulses. In exemplary embodiments, the predetermined measurement window may be, for example, 3 ms, 4 ms, 5 ms, 6 ms, 7 ms, 8 ms, 9 ms, 10 ms, 11 ms, 12 ms, or various values there between. In preferred embodiments the predetermined measurement window may be 10 ms or less. If a predetermined number of pulses, for example, 15 pulses, or more occur within the predetermined measurement window, MCU 221 may determine that a ground fault, specifically a neutral to ground leakage, has occurred. Then, MCU 221 may, for example, through a signal provided at TRIG1, initiate a process to trip the GFCI mechanism to cease providing power to the outlet.

As described in further detail below, MCU 221 may also be configured perform a self-test and may—for example, through a signal provided at an EOL output pin of MCU 221—initiate a mechanical process to permanently place GFCI in an EOL state where the self-test is conclusively failed.

Figure 3B:
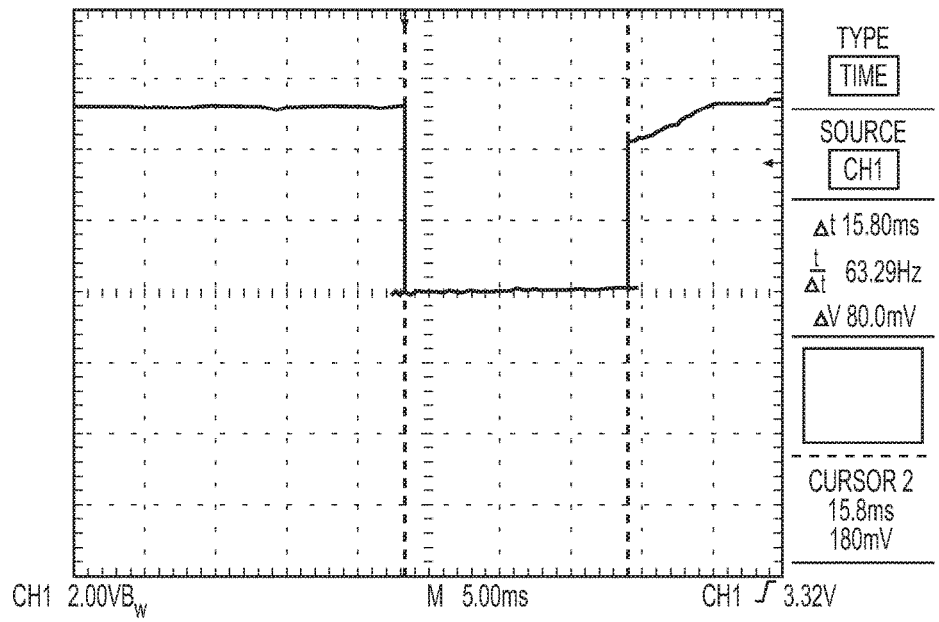

FIG. 3B depicts a leakage signal waveform that may occur, for example if a leaked current dangerously travels through a human body, in response to a leaking current of 240 mA. A human body may have an electrical resistance load of approximately 500 Ohm. Thus, with a supply voltage of 120 $V_{AC}$, the typical leaking current through a human body would be approximately 240 mA. In the example of FIG. 3B, it may be observed that the logic low is approximately 15.8 ms, which is greater than 1.7 ms. As such, this waveform is indicative of a ground fault with a current imbalance that is greater than 5 mA. Thus, in this situation, MCU 221 may initiate a process to trip the GFCI mechanism, and cease providing power to the outlet.

Figure 3C:
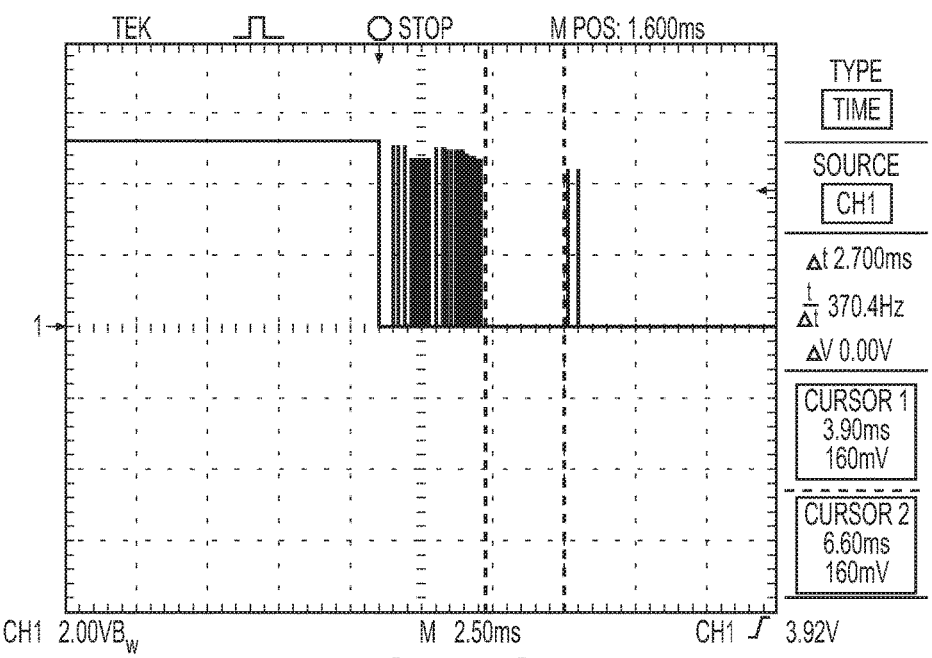
Figure 3D:
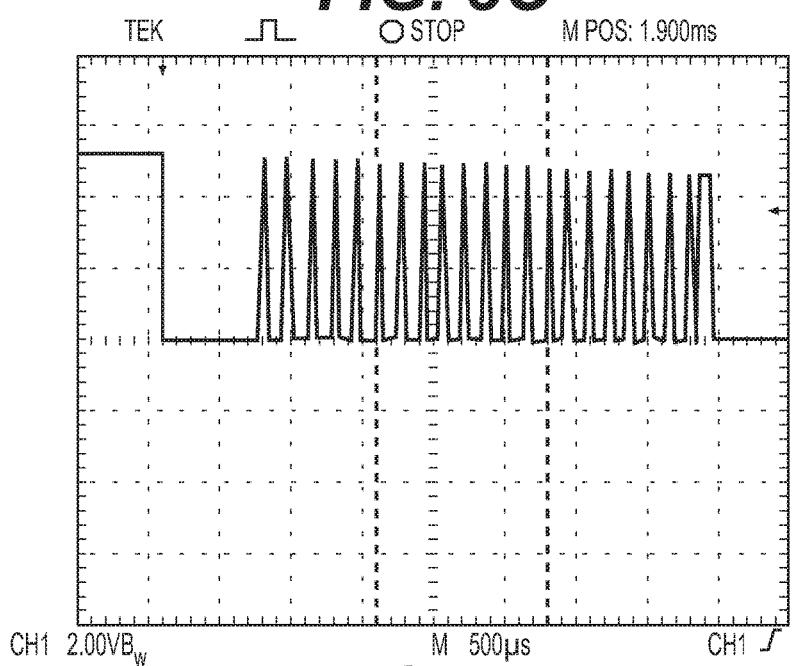
Figure 3E:
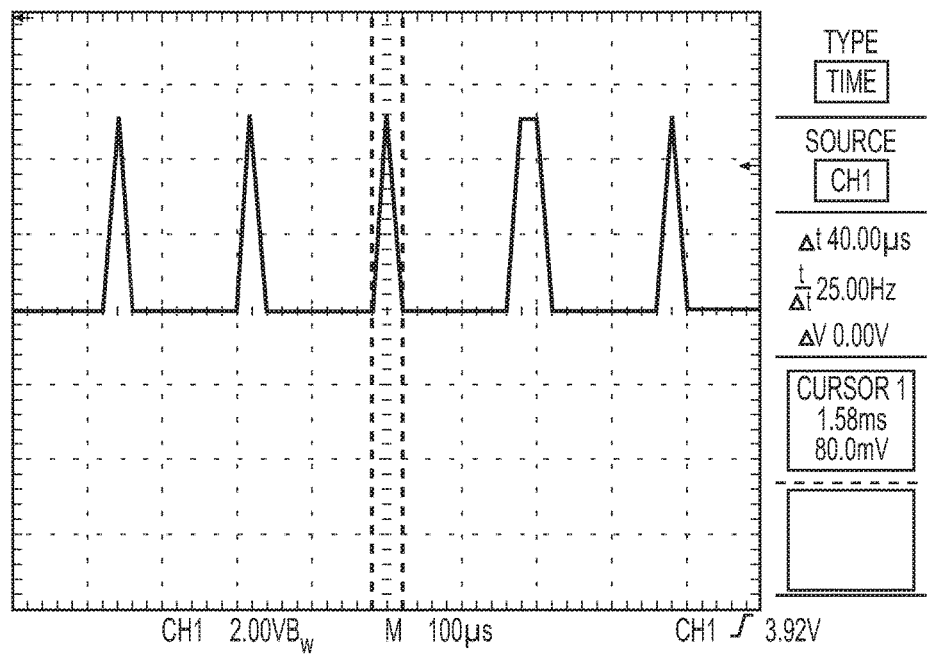

FIG. 3C depicts a leakage signal waveform that may occur, for example if there is a nearly direct leakage from neutral to ground, shown with a time scale of 2.5 ms/div. Specifically, the waveform of FIG. 3C was generated by effectively shorting neutral and ground with a mere 1.6 Ohms of resistance. As can be more clearly observed in FIG. 3D, which is the waveform of FIG. 3C shown with a time scale of 0.5 ms/div, 15 pulses occur during a predetermined measurement window of 3 ms. As such, this waveform has a time pattern that is indicative of a neutral to ground leakage. Thus, in this situation, MCU 221 may initiate a process to trip the GFCI mechanism, and cease providing power to the outlet. FIG. 3E depicts the waveform of FIG. 3C shown with a time scale of 0.1 ms/div.

Figure 2D:
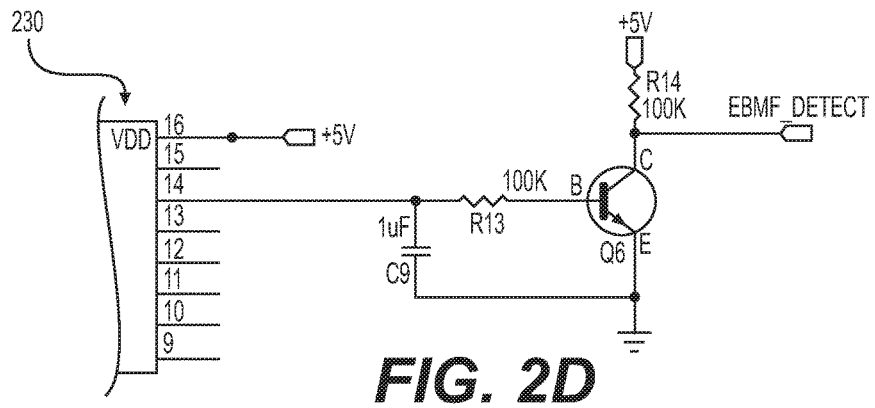

FIG. 2D depicts an exemplary back-EMF detection circuit 230 of GFCI circuit 200. Use of a back-EMF detection signal from back-EMF detection circuit 230 may serve to minimize false detection of ground faults and inappropriate trips caused by noisy back-EMF generated by certain electrical appliances.

When an electrical appliance, for example, a shaver or the like, is switched off it may generate back-EMF noise, which may cause a current imbalance resembling a ground fault. In turn, a ground fault may be detected where none exists and a GFCI may be inappropriately tripped. Back-EMF noise may also cause the 5 V $V_{CC}$ for MCU 221 to be noisy, which may result in unstable MCU 221 behavior.

With reference to FIGS. 2A and 2D, an I/O pin of MCU 221, for example pin 14, may provide an instability signal in response to the back-EMF noise. This instability signal may charge a capacitor C9 of back-EMF detection circuit 230 and cause a transistor Q6 of back-EMF detection circuit 230 to switch on. The collector pin of transistor Q6 may generate a back-EMF detection signal at EMBF_DETECT, which in turn may be provided to another interrupt of MCU 221, for example at pin 7. When the back-EMF detection signal is low and until it returns to high, ground fault determinations by MCU 221 may be precluded. This may occur when EMBF_DETECT is grounded through transistor Q6. Once the back-EMF detection signal is returned to high, e.g., 5V, it may be inferred that 5 V Vcc is sufficiently restored.

Figure 3F:
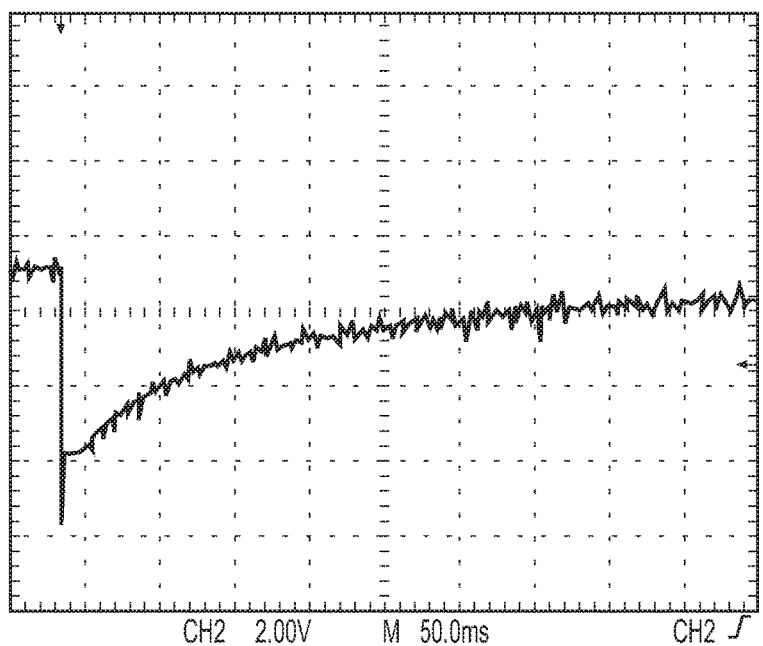
Figure 3G:
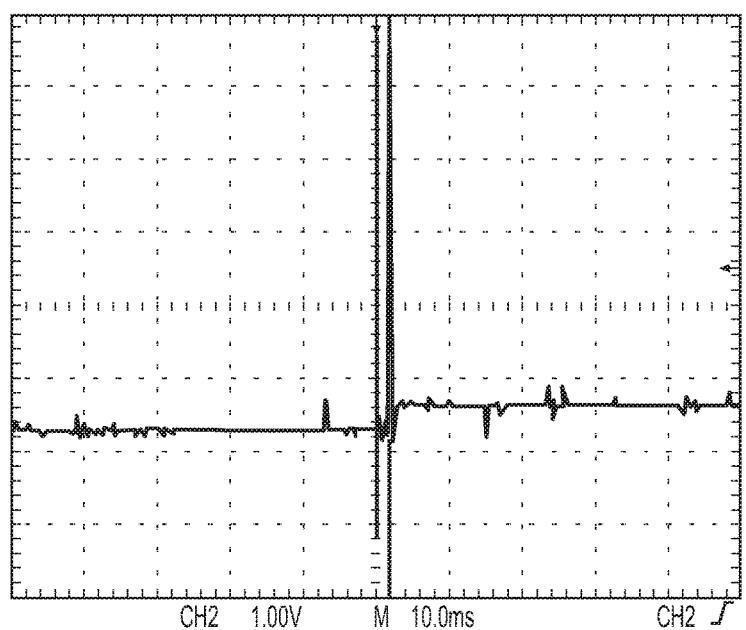

FIG. 3G depicts a typical back-EMF spike that may occur at an output of MCU 221, here pin 14, when an electrical appliance, such as an electric shaver, is switched off. In the depicted example, the voltage of this spike jumps to approximately 600 mV, which discharges when the back-EMF ceases. FIG. 3F depicts the resulting back-EMF detection signal at EMBF_DETECT before the spike, when transistor Q6 switches on, and finally when Q6 gradually turns off as the charge on capacitor C9 diminishes. During the time between the sharp fall and slow recharge of the back-EMF detection signal, MCU 221 may determine that back-EMF noise, rather than a ground fault has occurred. Thus, as long as the back-EMF detection signal does not read as a logic high, MCU 221 may disable its ability to determine that a ground fault exists or just occured and, as a result, may not be able to trip the GFCI unit.

Various predetermined values, including, for example, one or more of a current imbalance threshold, a logic low threshold, a predetermined measurement window, a predetermined number of pulses, and an RMS voltage threshold level may be determined by laboratory tests. For example, the values that govern ground fault assessment may be adjustable and, in some embodiments, may be calibrated to reflect each batch of components used to assemble a particular manufacturing run of GFCI devices. For example, such batch-specific calibration may be necessary to assure that improper ground fault assessments (including false positives) are kept to a minimum and/or compliance with UL or other desired certifications.

When appropriate, for example, when a ground fault is detected, MCU 221 may provide a trip signal via TRIG1, as depicted in FIG. 2A, to at least temporarily remove power provided to the relay T3 of FIG. 2A and thereby trip the GFCI device via trip coil assembly 17, as discussed below. This may place the GFCI in a tripped condition, whereby the supply of power through a GFCI device is halted. If appropriate, for example, when an EOL condition is determined, GFCI circuitry 200, may, provide an EOL signal via an EOL output pin of MCU 221 to safety lock coil assembly 18. As discussed below, providing such a signal may cause a GFCI device to enter an EOL state.

Figure 2E:
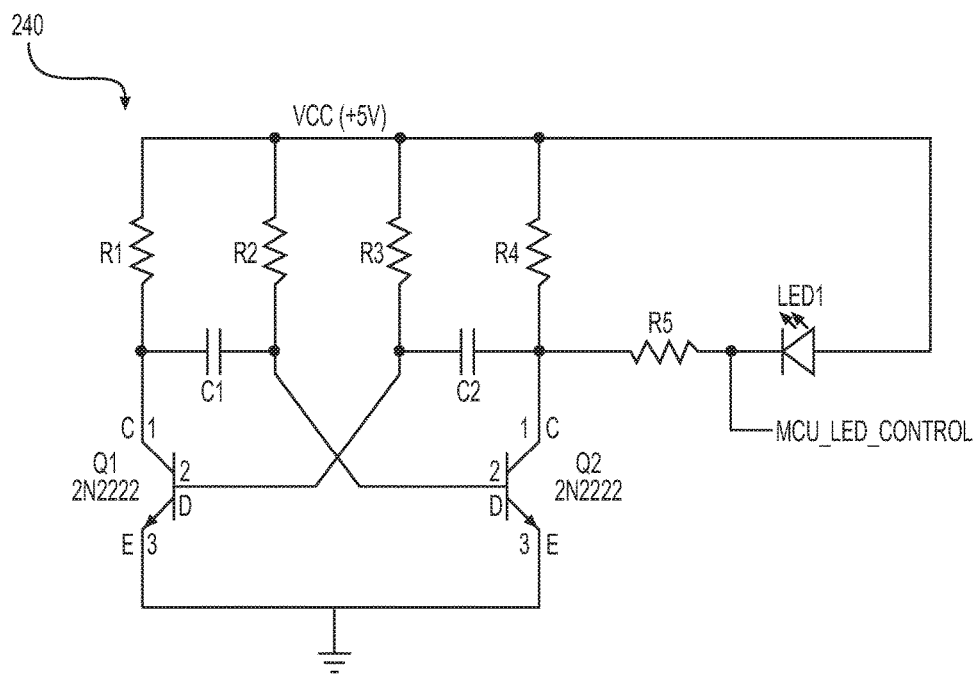
FIG. 2E depicts a circuit diagram of an embodiment of a failsafe circuit for a GFCI, consistent with the present disclosure.

In some embodiments, GFCI circuitry 200 may include additional fail-safes to prevent it from providing power if MCU 221 suffers a malfunction. Because the ground fault detection and self-testing described herein may only be reliable with a properly functioning MCU 221, it may be advantageous for GFCI circuitry 200 to detect an MCU 221 malfunction, and cease providing power and/or notify a user of the malfunction in response. To accomplish this, GFCI 100 may further include a simple failsafe circuit that would, as a default, maintain the GFCI in a tripped state and/or provide a continuous alert signal. FIG. 2E illustrates an exemplary embodiment of such a failsafe circuit. The alert signal may, for example cause a red LED of the GFCI, e.g., D2, to blink continuously. MCU 221 may be further programmed to provide a proper operation signal to the failsafe circuit when it is functioning, for example at TP2, pin13, which may provide a signal at MCU_LED_CONTROL. Upon receipt of the failsafe signal, the failsafe circuit may cease from keeping GFCI 100 in a tripped state and may cease from providing the continuous alert signal.

Figure 4A:
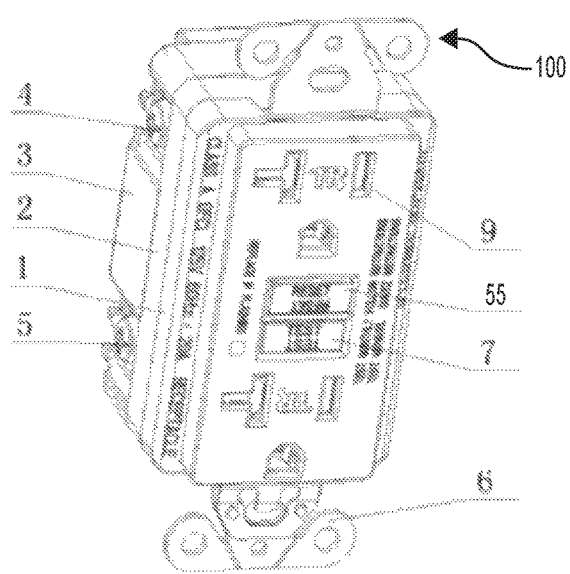
FIGS. 4A-4G are perspective, front, side, back, bottom, exploded, and further exploded views, respectively of an embodiment of a GFCI outlet, consistent with the present disclosure.
Figure 4B:
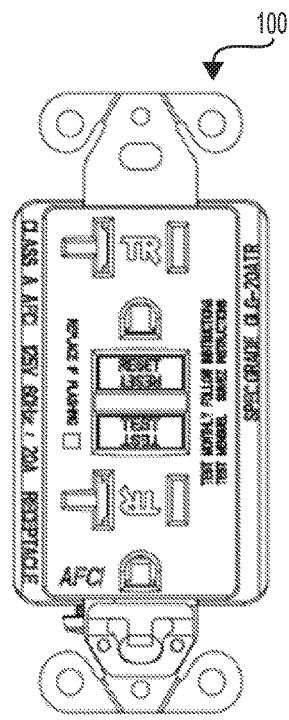
Figure 4C:
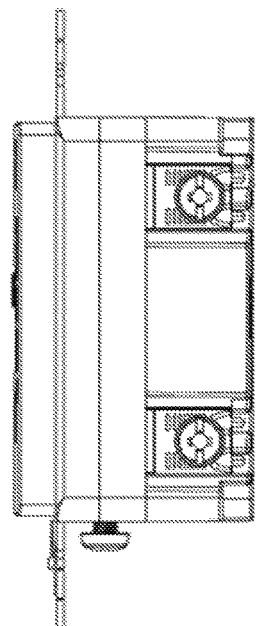
Figure 4D:
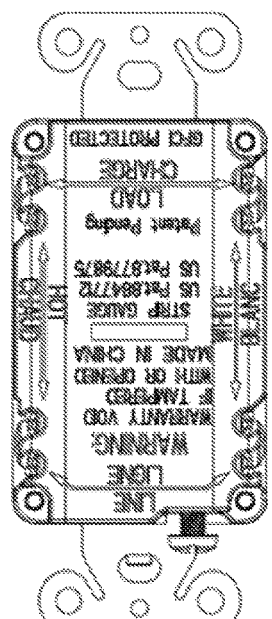
Figure 4E:
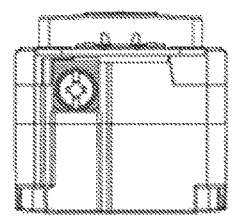
Figure 4F:
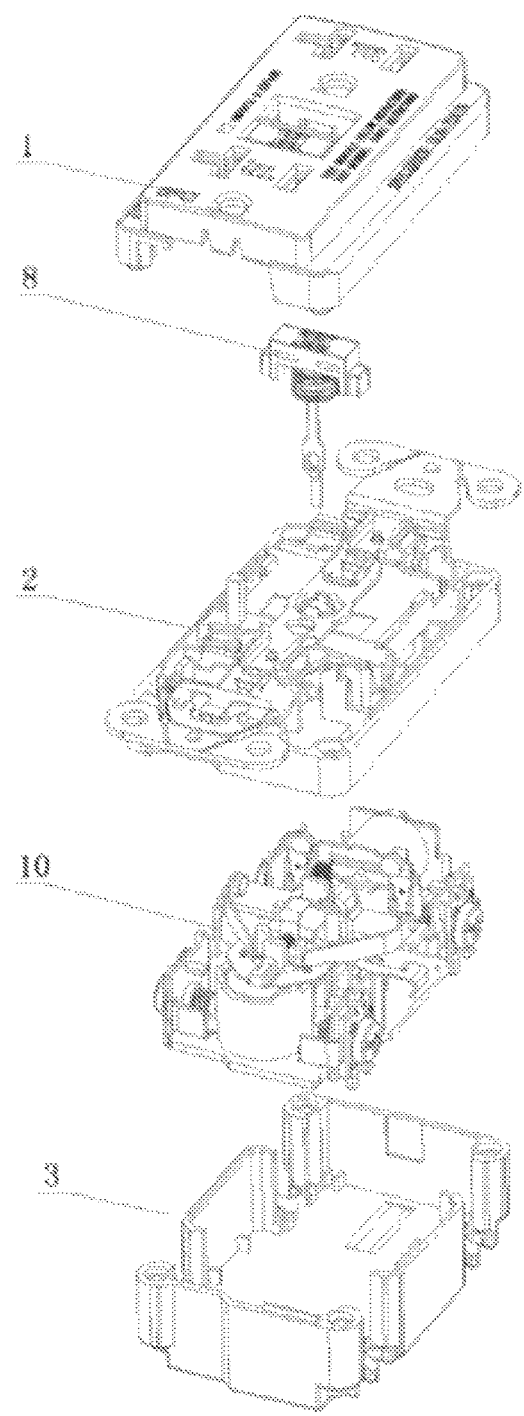
Figure 4G:
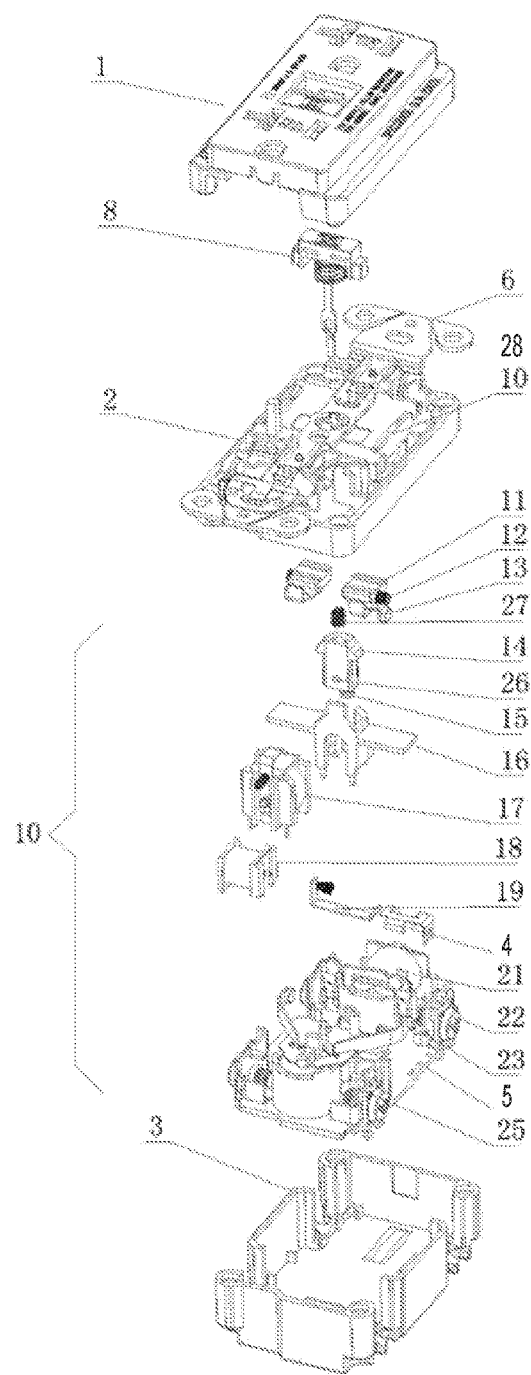
Figure 4L:
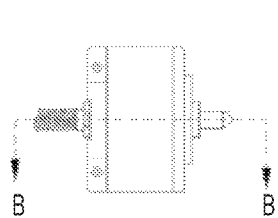
FIGS. 4L-4N are views of a trip coil assembly of the embodiment of FIGS. 4A-4G.
Figure 4M:
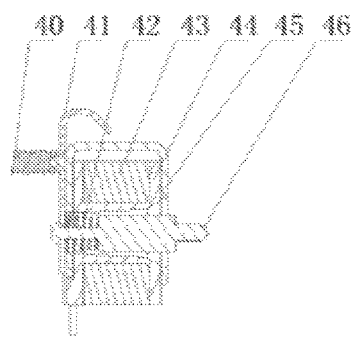
Figure 4N:
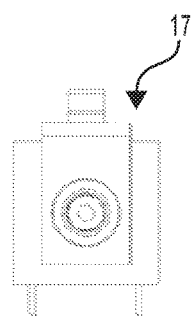
Figure 4O:
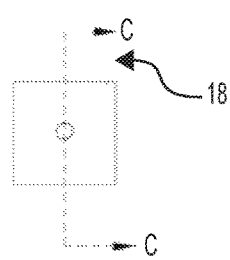
FIGS. 4P and 4O are cross-sectional and side views, respectively, of a safety lock coil assembly of the embodiment of FIGS. 4A-4G.
Figure 4P:
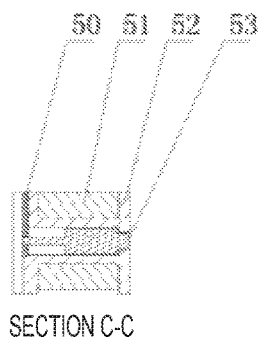
Figure 4Q:
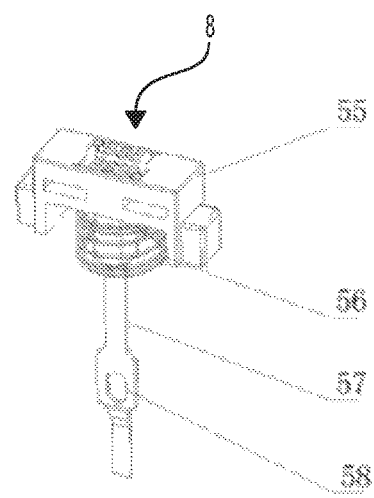
FIG. 4Q is a perspective view of a reset button assembly of the embodiment of FIGS. 4A-4G.
Figure 4R:
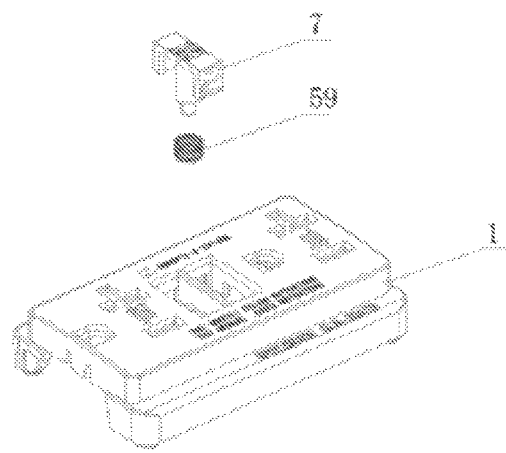
FIGS. 4R and 4S are perspective exploded and perspective cross-sectional views of a front portion of the embodiment of FIGS. 4A-4G.
Figure 4S:
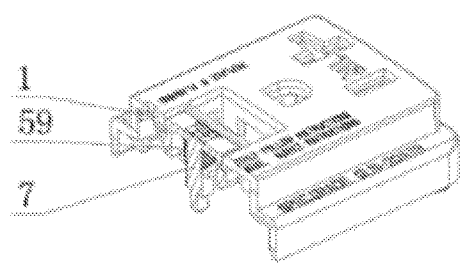
Figure 4T:
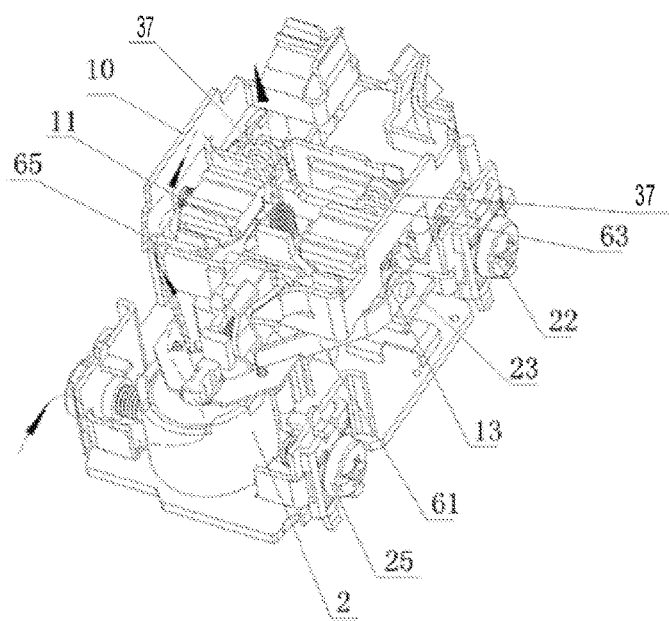
FIGS. 4T and 4U are a perspective view and a cross-sectional view, respectively, of a mainboard assembly and other components of the embodiment of FIGS. 4A-4G.
Figure 4U:
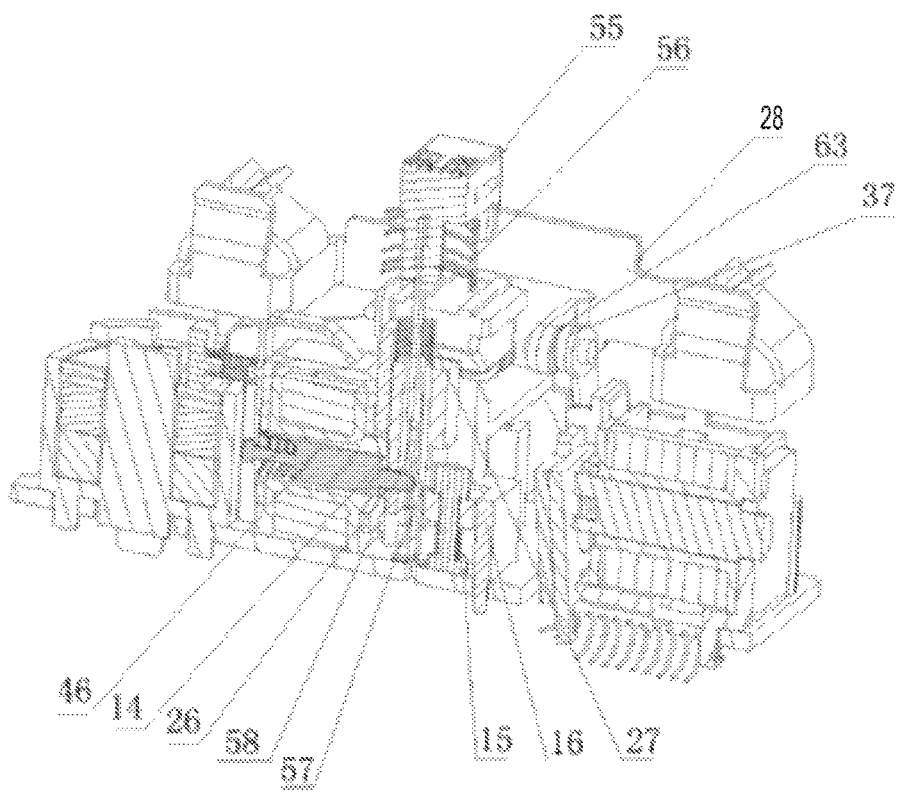

With reference to FIGS. 4A-4U, the physical structure of a preferred embodiment of a GFCI outlet 100 containing GFCI circuitry 200 is disclosed. Although GFCI outlet 100 is discussed in detail as an example, GFCI circuitry 200 and other technologies disclosed herein may be adapted for use in GFCI circuit breakers in other forms and configurations, as would be understood by persons of skill in the art.

With reference to FIG. 4A, which is a perspective view of an uninstalled GFCI outlet 100, the outlet may comprise face casing 1, middle casing 2, bottom casing 3, output connector assembly 4 to connect the neutral line, input connector assembly 5 to connect to the input line, and ground iron piece 6 to be grounded. Face casing 1 may provide access to electrical jacks 9, reset button 55, and test button 7. FIGS. 4B-4E provide additional views of uninstalled GFCI outlet 100.

FIG. 4F provides an exploded view of GFCI outlet 100, which further depicts mainboard assembly 10, which is disposed between and is substantially enclosed by middle frame 2 and bottom casing 3. FIG. 4F also depicts reset button assembly 8.

FIG. 4G provides a further exploded view of GFCI outlet 100. As depicted, middle frame 20 comprises ground iron piece 6 and static middle frame element 28. Mainboard assembly 10 may include sliding bars 11, sliding bar springs 12, sliding bar movable contacts 13, slider 14, slider spring 27, slider linking hole 26, K1 switch 15, and reset rack seat 16, which may engage with each other to facilitate tripping and resetting of GFCI 100. Further, mainboard assembly may include trip coil assembly 17, safety lock coil assembly 18, safety lock 19, safety lock buckle 20, relay assembly 21, output connector assembly 4, input static contacts 23, mainboard 24, and input connector assembly 5.

FIGS. 4H-4K provide additional detail of relay assembly 21 via cross-sectional, front, side and bottom views, respectively (with reference to positioning in FIG. 4G). Relay assembly 21 may include relay rack 30, relay frame 31, relay iron core 32, relay coil 33, relay spring 39, relay copper piece 38, K2 switch 34, relay movable piece 36, relay movable contact 37, and relay attraction plate 35.

FIGS. 4L-4N provide additional detail of trip coil assembly 17 via bottom, cross-sectional, and back views, respectively (with reference to positioning in FIG. 4G). Trip coil assembly 17 may include trip steel piece spring 40, trip steel piece 41, trip iron core spring 42, trip coil 43, trip coil frame 44, trip attraction plate 45, and trip iron core 46.

FIGS. 4O and 4P provide additional detail of safety lock coil assembly 18 via cross-sectional and side views, respectively (with reference to positioning in FIG. 4G). Safety lock coil assembly 18 may include safety lock coil attraction plate 50, safety lock coil 51, safety lock coil frame 52, and safety lock iron core 53. FIG. 4P depicts safety lock coil assembly 18 in an unactivated configuration.

FIG. 4Q provides additional detail of reset button assembly 8 via a perspective view. Reset button assembly 8 may comprise reset button 55, reset spring 56, and reset rod 57 with reset rod locking hole 58.

FIG. 4R depicts an exploded view of face casing 1, test button 7, and test button spring 59. FIG. 4S depicts a cross-sectional view of test button 7 and test button spring 59 assembled within face casing 1.

FIG. 4T provides additional detail of mainboard assembly 10 and other components via a perspective view. As shown, GFCI outlet 100 may additionally include magnetic seat 2, power supply connection assembly 61, mainboard assembly 35, element static contact 63, and connecting wires 65.

FIG. 4U is a partial depiction of a cross-section of GFCI 100, which illustrates the integration of reset button assembly 8 components with mainboard assembly 10 components.

With reference to FIGS. 5A-5H, certain operations of a preferred embodiment of GFCI outlet 100 are described.

Figure 5A:
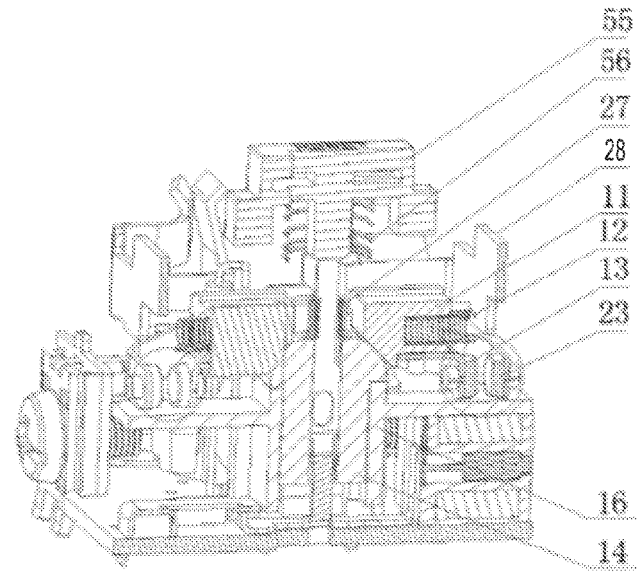
FIGS. 5A-5I are cross-sectional perspective views of the embodiment of FIGS. 4A-4G that illustrate various GFCI device states, consistent with the present disclosure.

FIG. 5A is a cross-sectional view of components of GFCI outlet 100. This figure illustrates the initial, tripped, non-conductive state of an exemplary GFCI outlet 100. Due to force exerted by reset spring 56, the reset button 55 is in its top position, wherein it is fully extended towards and may be at least partially extended through face casing 1 (not shown). The tip of trip iron core 46 is positioned within slider linking hole 26 of slider 14 and preferably abuts an inclined portion of reset rod 57, just below reset rod linking hole 58. Slider 14 is maintained at the bottom of reset rack seat 16. In this position, slider 14 also contacts K1 switch 15, maintaining it in a closed position. Due to the force of sliding bar springs 12, sliding bars 11 are each located at an inner position. Sliding bar movable contacts 13 are attached to each of the sliding bars 11, respectively. As such, when sliding bars 10 are located at their inner positions, respectively, input static contacts 23 are separated from their corresponding sliding bar movable contacts 13. This separation maintains a non-conductive state of GFCI outlet 100 and prevents the supply of electric power through jacks 9.

Figure 5B:
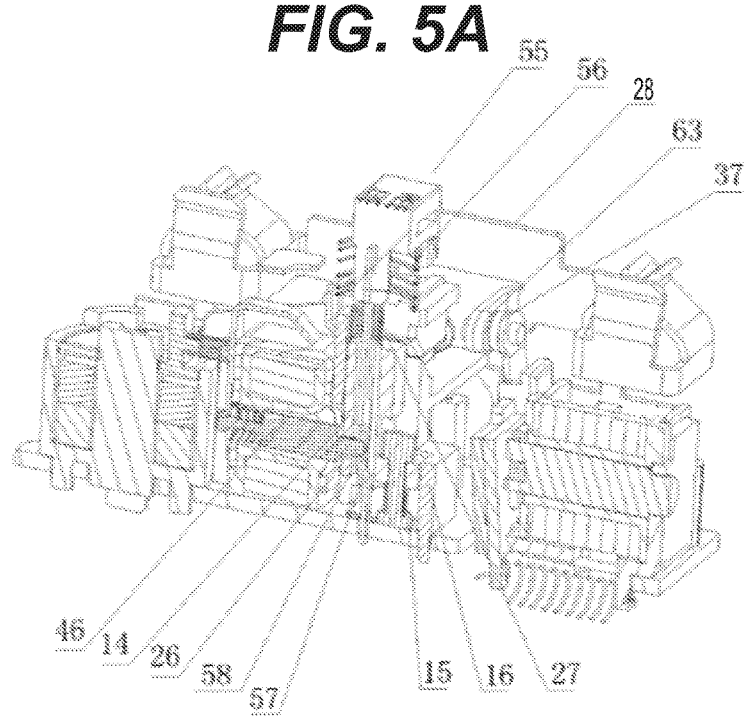
Figure 5C:
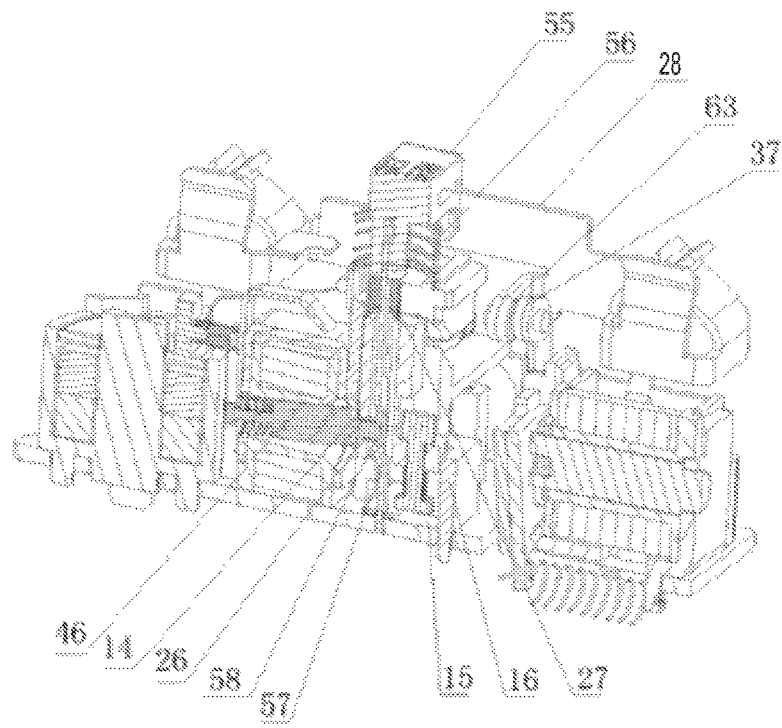
Figure 5D:
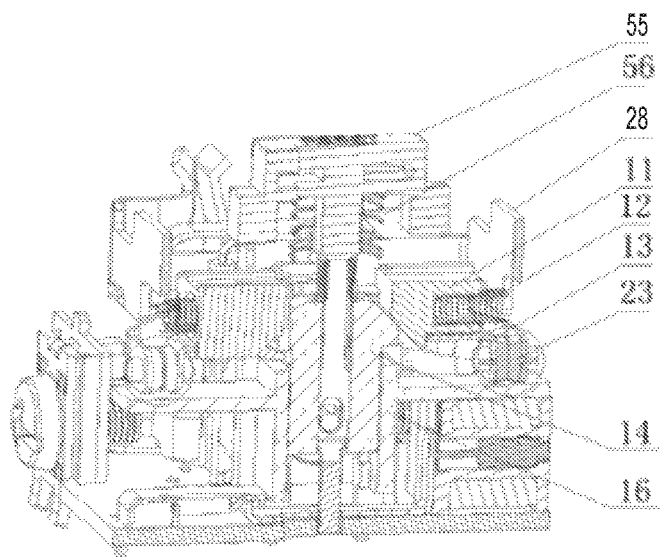

FIGS. 5B-5D are cross-sectional views of components of GFCI outlet 100 that illustrate the reset activation process in the circumstance where GFCI outlet 100 is wired correctly. As shown in FIG. 5B, when reset button 55 is manually pressed sufficiently to overcome the force of reset spring 56, reset button assembly 8, including reset rod 57, moves downward, bringing reset rod locking hole 58 into substantial alignment with trip iron core 46. Thus, due to force exerted by trip iron core spring 42, the tip of trip iron core 46 slides into reset rod locking hole 58.

As shown in FIGS. 5C and 5D, after reset button 55 is released, reset spring 56 pushes reset assembly 8 back into its top position. As shown, due to the engagement of the trip iron core 46 with both reset rod locking hole 58 and slider linking hole 26 of slider 14, slider 14 is brought upward into a top position along with reset button assembly 8. In this position, slider 14 opens K1 switch 15, where it is maintained. As a result of slider 14 movement, the inclined faces of slider 14 exert pressure on the corresponding inclined faces of sliding bars 11. In turn, the sliding bars 11 are pushed outward toward the sides of GFCI outlet 100, compressing their respective sliding bar springs 12. Ultimately, this outward movement causes sliding bar movable contacts 13 to respectively contact corresponding input static contacts 23. Upon such contact, outlet 100 may be placed in a conductive, reset state. That is, electric power may be provided through jacks 9.

Figure 5E:
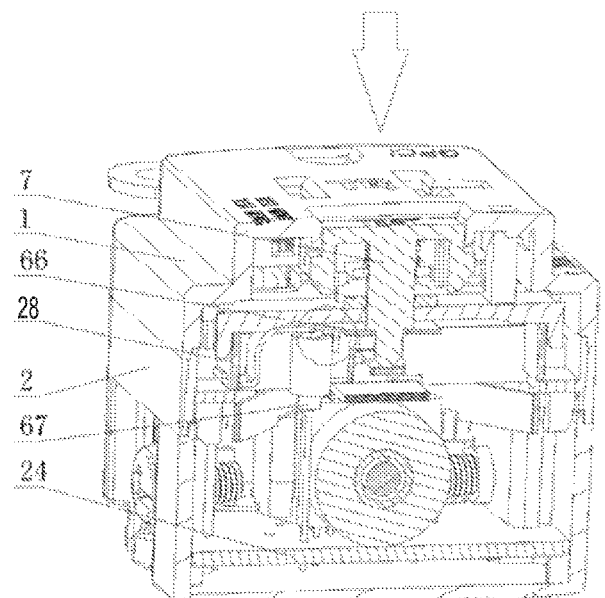
Figure 5F:
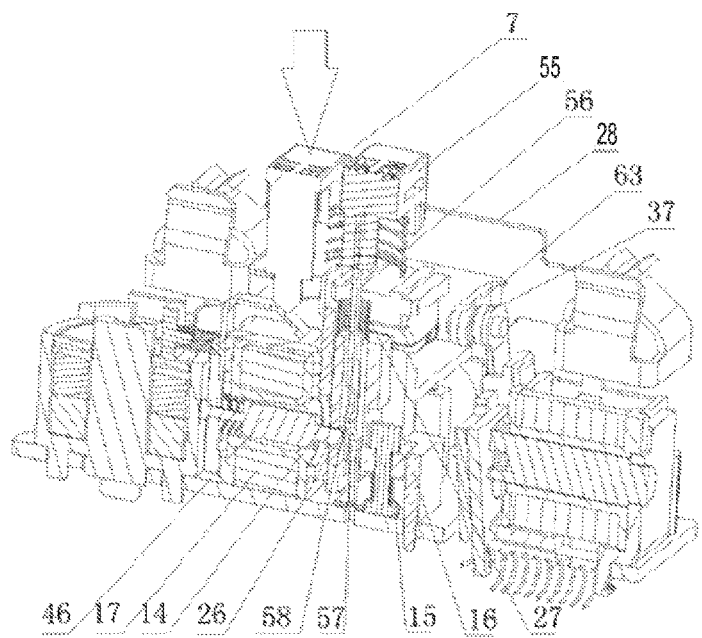

FIGS. 5E and 5F are cross-sectional views of GFCI outlet 100 and components thereof, respectively, that illustrate a tripping operation resulting from a manual test to ensure a proper fault response. As show in FIG. 5E, to test the tripping functionality of GFCI outlet 100, a user may press the test button 7, overcoming the force of test button spring 56. A lower portion of test button 7 may then cause test conducting element 66 to electrically link with test contact static element 67. In turn, this causes MCU 221 to provide a signal at MCU_SIMULATION to induce a simulated leakage current. Via processing operations described herein, GFCI circuitry 100 may register the simulated leakage current as a ground fault and may provide a trigger signal at TRIG1 (as shown in FIG. 2A).

Trip coil assembly 17 may be configured to receive the trigger signal provided at TRIG1. As show in FIG. 5F, the trigger signal, when received by trip coil assembly 17, ultimately creates an electromagnetic force that causes trip iron core 46 to retract against the force of trip iron core spring 42. As a result, the tip of trip iron core 46 disengages from reset rod locking hole 58, thereby disengaging slider 14 from reset button assembly 8. In turn, this permits reset button assembly 8 to move upward under the force of reset spring 56 and permits slider 14 to move to the bottom of reset rack seat 16 under pressure of slider spring 27. Slider 14 also contacts K1 switch 15, closing it. In turn, sliding bars 11 and their respective sliding bar movable contacts 13 return to their inner positions under the force of sliding bar springs 12, which separates sliding bar movable contacts 13 from input static contacts 23, and halts the supply of power to jacks 9.

The mechanical triggering process discussed in the preceding paragraph may also be initiated when MCU 221 provides a trigger signal at TRIG1 in response to determining the presence of a ground fault occurrence.

Further, in alternative embodiments, a trigger signal may be delivered as a result of a different type of fault, for example an arc fault, or in response to a remote command.

Figure 5G:
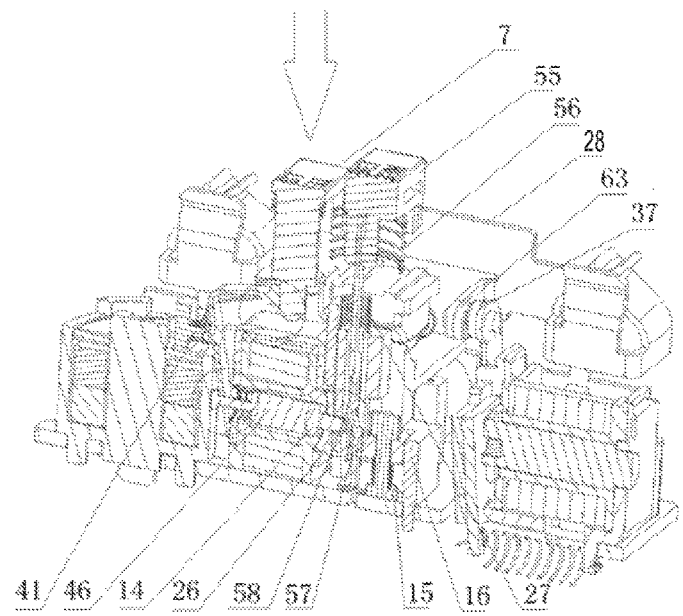

Tripping by manually pressing test button 7 may be possible through a fully mechanical process and, as such, may occur even in the absence of electricity. As shown in FIG. 5G, test button 7 may be fully pressed to the bottom of its stoke range. Here, the bottom portion of test button 7 may mechanically engage with trip steel piece 41, causing it to pivot about its mechanical connection point with the remainder of trip coil assembly 17 and to pull back trip iron core 46. In turn, this may cause the tip of trip iron core 46 to disengage from reset rod locking hole 58, thereby disengaging slider 14 from reset button assembly 8, permitting reset button assembly 8 to move upward under the force of reset spring 56 and permitting slider 14 to move to the bottom of reset rack seat 16 under pressure of slider spring 27. Slider 14 may also contact K1 switch 15, closing it. In turn, sliding bars 11 and their respective sliding bar movable contacts 13 may return to their inner positions under the force of sliding bar springs 12, which separates sliding bar movable contacts 13 from input static contacts 23, preventing the supply of power to jacks 9.

Figure 5H:
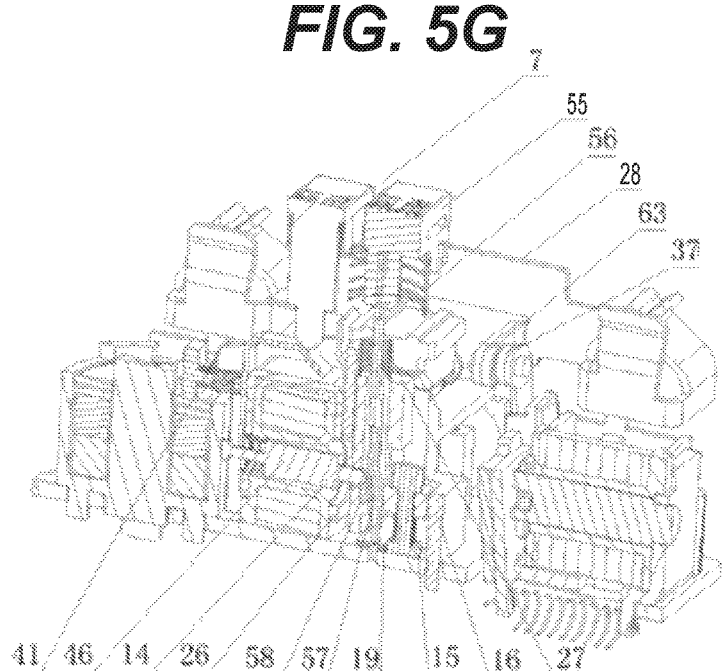
Figure 5I:
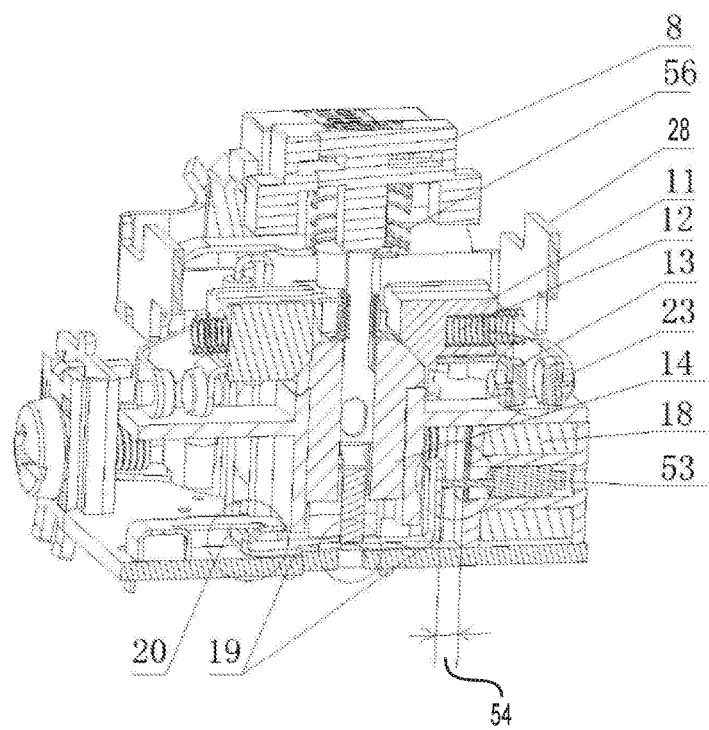

FIGS. 5H and 5I are cross-sectional views of components of GFCI outlet 100 that illustrate entry into an end-of-life state, whereby outlet 100 may be placed in a permanent tripped, non-conductive state. As shown in FIG. 5H, upon determining that outlet 100 should be place in an EOL state, MCU 221 may provide a trigger signal, for example at TRIG, that creates an electromagnetic force that causes trip iron core 46 to retract against the force of trip iron core spring 42. This may ultimately place GFCI outlet 100 into a tripped state in a manner identical or similar to that discussed above.

As shown in FIG. 5I, simultaneously or subsequently to proving the trip signal, MCU 221 may provide an EOL trigger signal at an EOL output pin of MCU 221. Receipt of this EOL trigger signal may activate safety lock coil 51, causing safety lock iron core 53 of safety lock coil assembly 18 to travel a distance 54 and partially push through a gap in safety lock coil attraction plate 50. There, safety lock iron core 53 may push safety lock 19 into safety lock buckle 20. Safety lock 19 and safety lock buckle 20 may engage, blocking any future downward movement of reset button assembly 8 and thereby preventing any further resetting of the tripped, disconnected GFCI outlet 100. Thus, a permanent EOL state may be achieved.

When GFCI outlet 100 is incorrectly installed such that the neutral and live lines of the electrical supply are reversed, power output through GFCI 100 may automatically be prevented. In one embodiment, relay assembly 21 may automatically be engaged in the presence of such reverse wiring to move relay movable contact(s) 37 away from mainboard assembly static(s) contact 63. For example, MCU 221 may trigger the relay assembly through a signal provided at TRIG; such signal may cause relay iron core 32 to move, but only in circumstances where the wiring is reversed. By separating normally connecting contacts 37 and 63, the connection between jacks 9 and input connector assembly 5 is severed. In this manner, reverse wiring protection may be achieved.

Figure 1:
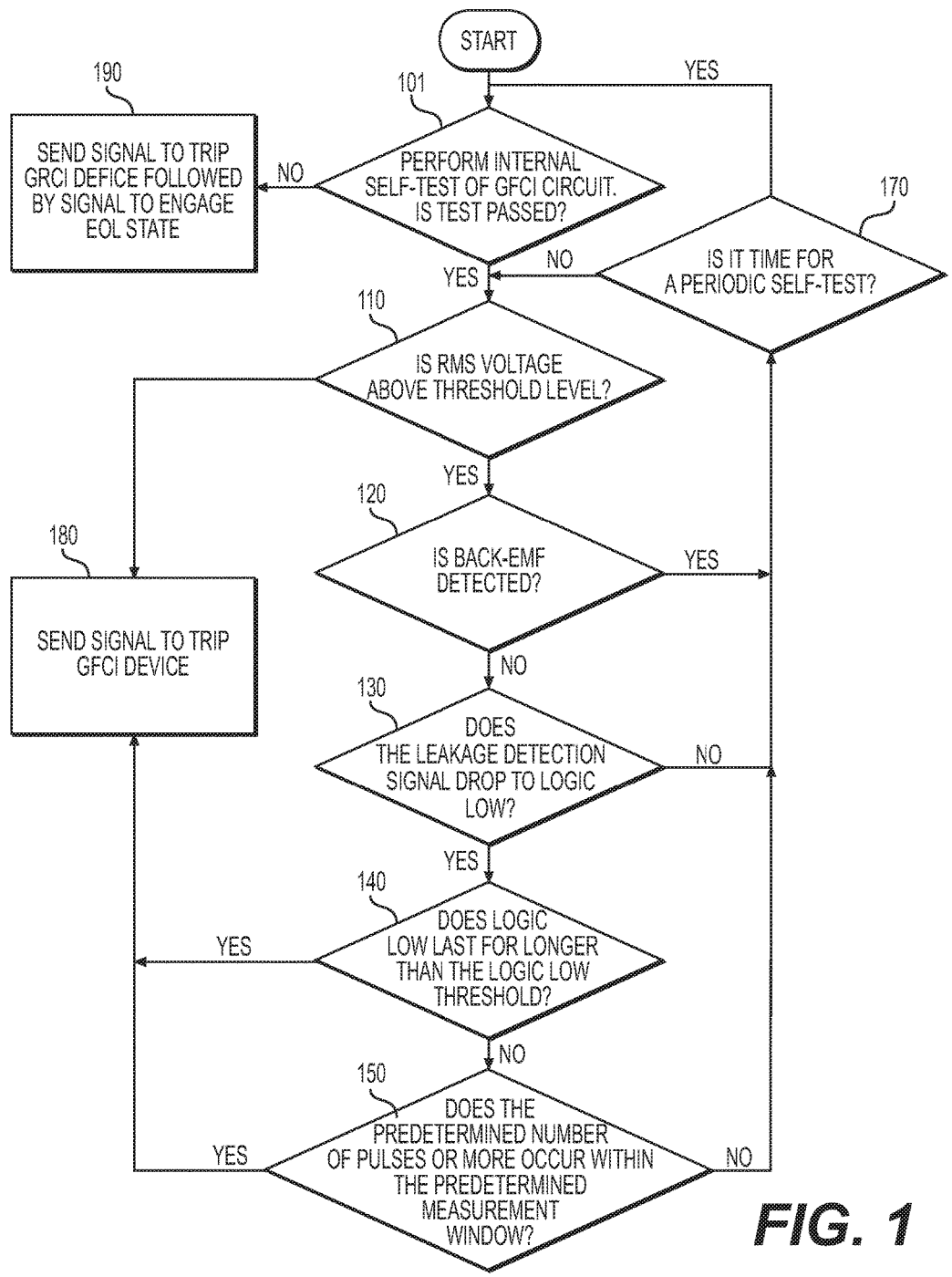
FIG. 1 is a flow diagram of an exemplary method of operation for a processor of a ground fault protection circuit, consistent with the present disclosure.

FIG. 1 provides an exemplary algorithm for ground fault detection and circuit interruption, consistent with instant disclosure. Such algorithm may preferably be accomplished by software programed on MCU 221 of GFCI circuitry 200 or the like. More generally, the steps of this algorithm may be performed by a computing device, in concert with other elements of GFCI circuitry 200. Software embodying the algorithms may be stored in non-volatile storage and/or memory within or outside of a processing device and may be executed by the processing device. As would be apparent to persons of skill in the art, the exact order of certain steps of the disclosed exemplary algorithm embodiments may be altered while still practicing the disclosed algorithms. Similarly, certain steps of the disclosed algorithm embodiments may be substituted, combined, or removed while still practicing the disclosed algorithms—consistent with the disclosure herein and/or as would be apparent to persons of skill in the art.

As in step 101, MCU 221 may perform a self-test of GFCI circuit 200 upon power up, or periodically. With reference to the circuit element in the bottom right corner of FIG. 2A, this self-test may comprise MCU 221 providing a signal at MCU_SIMULATION to switch on an SCR and allow current to flow to ground, through R3 in this example. This self-test may be to assure that GFCI circuitry 200 is able to properly detect a leakage current. If the simulated leakage current is detected, the self-test may be considered passed. MCU 221 may then indicate that the GFCI circuit 200 is normally operating by energizing, for example, a sold green LED indicator that is preferably visible on the face of the GFCI device. If the test is passed, the process may proceed to step 110.

However, if the GFCI circuit 200 fails a first internal self-test, a rest period, for example, 5 minutes, may be permitted to pass before the self-test is repeated. In some embodiments, a predetermined number of retesting and resting cycles may occur, for example, five cycles, before the GFCI is deemed to be in an EOL condition. If the GFCI outlet 100 has been determined to have reached its end of life, the process may proceed to step 190.

As in step 190, MCU 221 may deliver a triggering pulse or activation signal, e.g., at TRIG1, to trigger the trip coil assembly 17 and trip the GFCI, as well as a second triggering pulse or activation signal, e.g., at an EOL output pin of MCU 221, to place the tripped GFCI in an EOL state via safety lock coil assembly 18, as described above. Further, an alert indication of, for example, a blinking red LED may be activated to signify the EOL state to the user. Once in the EOL state, the device will not be able to be reset or return back to normal operation. The process is ended.

As in step 110, in some embodiments, MCU 221 may assess the RMS voltage to determine if there is an undesirable low-voltage operational condition is occurring. For example, with respect to the circuitry depicted in FIGS. 2A-2D, MCU 221 may receive an indication of the RMS voltage at MCU_V_ADC and convert it to a digital value. If the observed RMS voltage is at or above a threshold voltage level, for example, 80 $V_{AC}$, it may be determined that a low-voltage operational condition is not occurring and the process may proceed to step 120. If however, the RMS voltage is not above a detection threshold, it may be determined that the low-voltage operational condition is occurring. In such a case, MCU 221 may provide a signal, e.g., at TRIG1, to trigger the trip coil assembly 17 and trip the GFCI, as in step 180. Further, MCU 221 may provide an alert to the user of the low-voltage operational condition, for example by directing both a green LED and a red LED of GFCI 100 to remain on.

As in step 120, MCU 215 may assess the back-EMF detection signal, for example, the signal at EBMF_DETECT, as discussed above. If the back-EMF detection signal indicates that back-EMF noise may be occurring or has just occurred—which suggests that back-EMF noise might affect leakage current signal assessment—the process may proceed to step 170. In alternative embodiments, if the back-EMF detection signal indicates that back-EMF noise may be occurring or has just occurred, the process may pause until the back-EMF detection signal returns to its normal condition. Where the back-EMF detection signal indicates that back-EMF is not occurring and that GFCI circuitry 200 has recovered from any recently occurring back-EMF noise, the process may proceed to step 130.

As in step 130, MCU 221 may monitor the leakage signal, for example the waveform at GFCI_DETECT, for a drop to logic low or another indication that there is an imbalance between the supply and return currents. If there is no drop to logic low, the process may proceed to step 170. If leakage signal drops to logic low, the process may proceed to step 140.

As in step 140, MCU 221 may analyze the leakage signal, for example the waveform at GFCI_DETECT, to compare the duration of the logic low to a logic low threshold, for example, of 1.7 ms or of another duration between 1.6 ms and 1.8 ms. In other embodiments, the leakage signal may be monitored to check whether the current imbalance is greater than or equal to a current imbalance threshold of, for example, 5 mA or another current between 4 mA and 6 mA, via another method. If the logic low threshold is exceeded (or, met or exceeded, in some embodiments), MCU 221 may determine that a ground fault has occurred; MCU 221 may then provide a signal, e.g., at TRIG1, to trigger the trip coil assembly 17 and trip the GFCI outlet 100, as in step 180. If, however, the logic low threshold is not exceeded (or, not met, in some embodiments), the process may proceed to step 150.

As in step 150, MCU 221 may analyze the leakage signal, for example the waveform at GFCI_DETECT, to count the number of pulses that occur within a predetermined window of, for example, 10 ms or another duration less than 10 ms. If the number of counted pulses with the predetermined window meets or exceeds (or just exceeds, in some embodiments) a predetermined number of pulses of, for example, 15 pulses or another number between 12 and 18, then MCU 221 may determine that a neutral to ground leakage has occurred. MCU 221 may then provide a signal, e.g., at TRIG1, to trigger the trip coil assembly 17 and trip the GFCI, as in step 180. If, however, the predetermined number of pulses is not exceeded (or not met, in some embodiments), the process may proceed to step 170.

As in step 170, MCU 221 may determine whether it is time for another self-test. In some embodiments, a self-test may be required every 2.5 hours. In other embodiments, the self-test interval may larger or smaller, for example between 1 and 4 hours; it may be determined by UL or other regulatory requirements. If it is time for a periodic self-test, then the process may proceed to step 101. Otherwise, the process may proceed to step 110.

As in step 180, upon a determination that there is a ground fault, or other serious electrical fault, MCU 221 may cause GFCI 200 to enter a tripped state. The process may end here. A solid red LED signal may indicate that a ground fault has occurred. As is known in the art, the process may then restart upon a manual pressing (and release) of reset button 55, provided that the electrical fault is no longer occuring.

In some embodiments, in addition to or alternatively to the self-test procedure, MCU 221 may periodically monitor its the operating condition, for example, input voltage and input current to ensure normal operating conditions. As an example, step 110, discussed above, may be included in such monitoring instead of its position within the flowchart of FIG. 1. Such monitoring may proceed, for example, every 10-15 minutes. In the event that there is an abnormal operating condition detected during the constantly monitoring process, MCU 221 may cause a red LED to blink as an indication of such an error. Thus, if such a situation persists, a user may be alerted to investigate possible causes of such irregularities by the blinking red LED.

When GFCI 100 is running properly, it may indicate such an operating condition by illuminating a green LED.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A ground fault circuit interrupter, comprising:
   a current imbalance detection circuit configured to provide a leakage signal, the leakage signal corresponding to a current imbalance between a supply path and a return path;
   a back-EMF detection circuit configured to provide a back-EMF detection signal; and
   a main processing circuit comprising a processor,
   wherein the processor is configured to:
      receive the leakage signal;
      analyze a time pattern of the leakage signal;
      receive and evaluate the back-EMF detection signal;
      determine whether a ground fault exists based on analysis of the time pattern, provided that back-EMF noise is not occurring and has not just occurred; and
      generate a first trigger signal if the ground fault is determined to exist.

2. The ground fault circuit interrupter of claim 1, wherein the processor is further configured to:
   analyze the time pattern by measuring a duration of a logic low of the leakage signal; and
   determine that the ground fault exists if the duration of the logic low is greater than a predetermined logic low threshold and the back-EMF detection signal indicates that back-EMF noise is not occurring and has not just occurred.

3. The ground fault circuit interrupter of claim 1, wherein the processor is further configured to:
   analyze the time pattern by counting a number of pulses of the leakage signal occurring within a predetermined measurement window; and
   determine that the ground fault exists if the number of counted pulses is greater than a predetermined number of pulses and the back-EMF detection signal indicates that back-EMF noise is not occurring and has not just occurred.

4. The ground fault circuit interrupter of claim 1, wherein:
   the processor is further configured to be interrupted when the leakage signal drops from a logic high to a logic low.

5. The ground fault circuit interrupter of claim 1, wherein the processor is further configured to:
   determine that back-EMF noise is not occurring and has not just occurred if the back-EMF detection signal is a logic high.

6. The ground fault circuit interrupter of claim 2, wherein the predetermined logic low threshold is between 1.6 ms and 1.8 ms.

7. The ground fault circuit interrupter of claim 3, wherein:
   the predetermined measurement window is less than or equal to 10 ms; and
   the predetermined number of pulses is between 12 and 18.

8. The ground fault circuit interrupter of claim 1, wherein the processor is further configured to:
- receive an RMS voltage signal;
- determine that a low-voltage operational condition is occurring if the RMS voltage signal is not above a detection threshold; and
- generate the first trigger signal if the low-voltage operational condition is occurring.

9. The ground fault circuit interrupter of claim 1, further comprising:
- a trip coil assembly configured to trip the ground fault circuit interrupter in response to the first trigger signal; and
- a reset button assembly configured to place the tripped ground fault circuit interrupter back into an operating condition.

10. The ground fault circuit interrupter of claim 1, wherein the processor is further configured to:
- administer a self-test at start-up and cyclically on a self-test interval to determine if the ground fault circuit interrupter is in an end-of-life condition; and
- generate the first trigger signal and a second trigger signal if the ground fault circuit interrupter is in the end-of-life condition.

11. The ground fault circuit interrupter of claim 10, wherein the self-test interval is between 1 and 4 hours.

12. The ground fault circuit interrupter of claim 10, further comprising:
- a trip coil assembly configured to trip the ground fault circuit interrupter in response to the first trigger signal; and
- a safety lock coil assembly configured to place a tripped ground fault circuit interrupter in a mechanically permanent end-of-life state in response to the second trigger signal.

13. The ground fault circuit interrupter of claim 12, further comprising:
- a reset button assembly,
- wherein, if the ground fault circuit interrupter is in the mechanically permanent end-of-life state, the reset button assembly is mechanically blocked from downward movement.

14. The ground fault circuit interrupter of claim 13, further comprising:
- a force trigger testing mechanism configured to trip the ground fault circuit interrupter regardless of whether the ground fault interrupter is powered; and
- a test button configured to activate the force trigger testing mechanism.

15. The ground fault circuit interrupter of claim 1, further comprising an LED,
- wherein the processor is further configured to:
  - monitor at least one of input voltage and input current on a monitoring interval to determine if there is an abnormal operating condition; and
  - provide a signal to the LED if the abnormal operating condition is determined to exist.

16. The ground fault circuit interrupter of claim 15, wherein the monitoring interval is between 10 and 15 minutes.

17. A method for detecting and responding to a ground fault, comprising:
- receiving a leakage signal;
- analyzing a time pattern of the leakage signal;
- receiving a back-EMF detection signal;
- evaluating the back-EMF detection signal;
- determining whether a ground fault exists based on analysis of the time pattern, provided that back-EMF noise is not occurring and has not just occurred; and
- generating a trigger signal if the ground fault is determined to exist.

18. The method of claim 17, wherein:
- analyzing the time pattern of the leakage signal comprises:
  - measuring a duration of a logic low of the leakage signal; and
  - comparing the duration of the logic low to a predetermined logic low threshold; and
- determining whether the ground fault exists comprises determining that the ground fault exists if the duration of the logic low is greater than the predetermined logic low threshold and the back-EMF detection signal indicates that back-EMF noise is not occurring and has not just occurred.

19. The method of claim 17, wherein:
- analyzing the time pattern of the leakage signal comprises counting a number of pulses of the leakage signal occurring within a predetermined measurement window; and
- determining whether the ground fault exists comprises determining that the ground fault exists if the number of counted pulses is greater than a predetermined number of pulses and the back-EMF detection signal indicates that back-EMF noise is not occurring and has not just occurred.

20. The method of claim 19, further comprising:
- if the ground fault is determined to exist, determining that the ground fault is a neutral to ground leakage if the number of counted pulses is greater than the predetermined number of pulses.

21. The method of claim 18, wherein the predetermined logic low threshold is between 1.6 ms and 1.8 ms.

22. The method of claim 19, wherein the predetermined measurement window is less than or equal to 10 ms and the predetermined number of pulses is between 12 and 18.

23. A method for detecting and responding to a ground fault, comprising:
- receiving a leakage signal;
- receiving a back-EMF detection signal;
- evaluating the back-EMF detection signal to determine whether back-EMF noise is not occurring and has not just occurred;
- if it has been determined that back-EMF noise is not occurring and has not just occurred, assessing a time pattern of the leakage signal to determine whether the ground fault exists; and
- generating a trigger signal if the ground fault is determined to exist.

24. The method of claim 23, wherein evaluating the back-EMF detection signal comprises:
- determining that back-EMF noise is not occurring and has not just occurred when the back-EMF detection signal is a logic high.

* * * * *